United States Patent
Otani et al.

(10) Patent No.: US 8,971,297 B2
(45) Date of Patent: Mar. 3, 2015

(54) BROADCASTING METHOD, ACCESS CONTROL APPARATUS, AND TERMINAL APPARATUS

(75) Inventors: Yoshiyuki Otani, Gifu (JP); Yumi Okamura, Mizuho (JP); Hanae Suzuki, Mizuho (JP)

(73) Assignee: Panasonic Intellectual Property Management Co., Ltd., Oska (JP)

( * ) Notice: Subject to any disclaimer, the term of this patent is extended or adjusted under 35 U.S.C. 154(b) by 186 days.

(21) Appl. No.: 13/142,324

(22) PCT Filed: Dec. 24, 2009

(86) PCT No.: PCT/JP2009/007175
§ 371 (c)(1),
(2), (4) Date: Aug. 16, 2011

(87) PCT Pub. No.: WO2010/073659
PCT Pub. Date: Jul. 1, 2010

(65) Prior Publication Data
US 2011/0292918 A1   Dec. 1, 2011

(30) Foreign Application Priority Data

Dec. 25, 2008  (JP) ................................. 2008-330966
Dec. 25, 2008  (JP) ................................. 2008-330967

(51) Int. Cl.
*H04J 3/00*   (2006.01)
*H04W 74/08*  (2009.01)

(52) U.S. Cl.
CPC ................................. *H04W 74/085* (2013.01)
USPC ....................................................... 370/336

(58) Field of Classification Search
CPC ................................................ H04W 72/0446
USPC ......... 370/237, 328, 336, 435, 253, 310, 338;
455/420, 436, 502, 515
See application file for complete search history.

(56) References Cited

U.S. PATENT DOCUMENTS 6,256,509 B1 *   7/2001   Tanaka et al. ................. 455/515
7,650,559 B2 *   1/2010   Nishibayashi et al. ....... 714/776
(Continued)

FOREIGN PATENT DOCUMENTS

| JP | 2005-202913 | | 7/2005 | |
| JP | 2005202913 A | * | 7/2005 | ............... G08G 1/16 |
| JP | 2008-301263 A | | 12/2008 | |
| WO | WO 2007/011031 A1 | | 1/2007 | |
| WO | WO 2008/149420 A1 | | 12/2008 | |

OTHER PUBLICATIONS

International Search Report issued in International Patent Application No. PCT/JP2009/007175 dated Apr. 6, 2010.
(Continued)

*Primary Examiner* — Chirag Shah
*Assistant Examiner* — Jael Ulysse
(74) *Attorney, Agent, or Firm* — McDermott Will & Emery LLP

(57) ABSTRACT

A processing unit generates the timing information on the timing with which each of radio apparatuses is to synchronize in communications between the radio apparatuses when each of radio apparatuses broadcasts a signal. A modem unit, an RF unit and an antenna broadcast the generated timing information. The processing unit further generates the cycle information on a broadcast cycle in which each radio apparatus broadcasts the signal in communication between the radio apparatuses. The modem unit, the RF unit and the antenna broadcast the cycle information together with the timing information.

13 Claims, 16 Drawing Sheets

(56) References Cited

U.S. PATENT DOCUMENTS

| | | | |
|---|---|---|---|
| 7,675,878 B2* | 3/2010 | Simpson et al. | 370/310.2 |
| 2004/0073361 A1* | 4/2004 | Tzamaloukas et al. | 701/210 |
| 2005/0009512 A1* | 1/2005 | Rue | 455/420 |
| 2005/0286480 A1* | 12/2005 | Akiyama | 370/338 |
| 2006/0025136 A1* | 2/2006 | Fujita et al. | 455/436 |
| 2007/0058660 A1* | 3/2007 | Sammour et al. | 370/445 |
| 2008/0002648 A1* | 1/2008 | Laroia et al. | 370/338 |
| 2008/0151849 A1* | 6/2008 | Utsunomiya et al. | 370/338 |
| 2008/0232389 A1* | 9/2008 | Wu et al. | 370/436 |
| 2009/0279449 A1* | 11/2009 | Kneckt et al. | 370/253 |
| 2009/0286564 A1* | 11/2009 | Ho | 455/502 |
| 2009/0316621 A1* | 12/2009 | Lane et al. | 370/326 |
| 2010/0008229 A1* | 1/2010 | Bi et al. | 370/237 |
| 2010/0060481 A1* | 3/2010 | Habaguchi et al. | 340/901 |
| 2010/0061347 A1* | 3/2010 | Bracha | 370/336 |
| 2010/0110949 A1* | 5/2010 | Lundsgaard | 370/311 |
| 2010/0157907 A1* | 6/2010 | Taghavi Nasrabadi et al. | 370/328 |

OTHER PUBLICATIONS

O. Moriya et al., "Variable Collision Avoidance Slots for Synchronous CSMA/MCA System on PTMP Access Networks," Transactions of Information Processing Society of Japan, Aug. 15, 2003, vol. 44, No. 8, pp. 2208-2217.

Office Action issued in Japanese Application No. 2008-330966 mailed Mar. 26, 2013.

Office Action issued in Japanese Application No. 2008-330967 mailed Mar. 26, 2013.

* cited by examiner

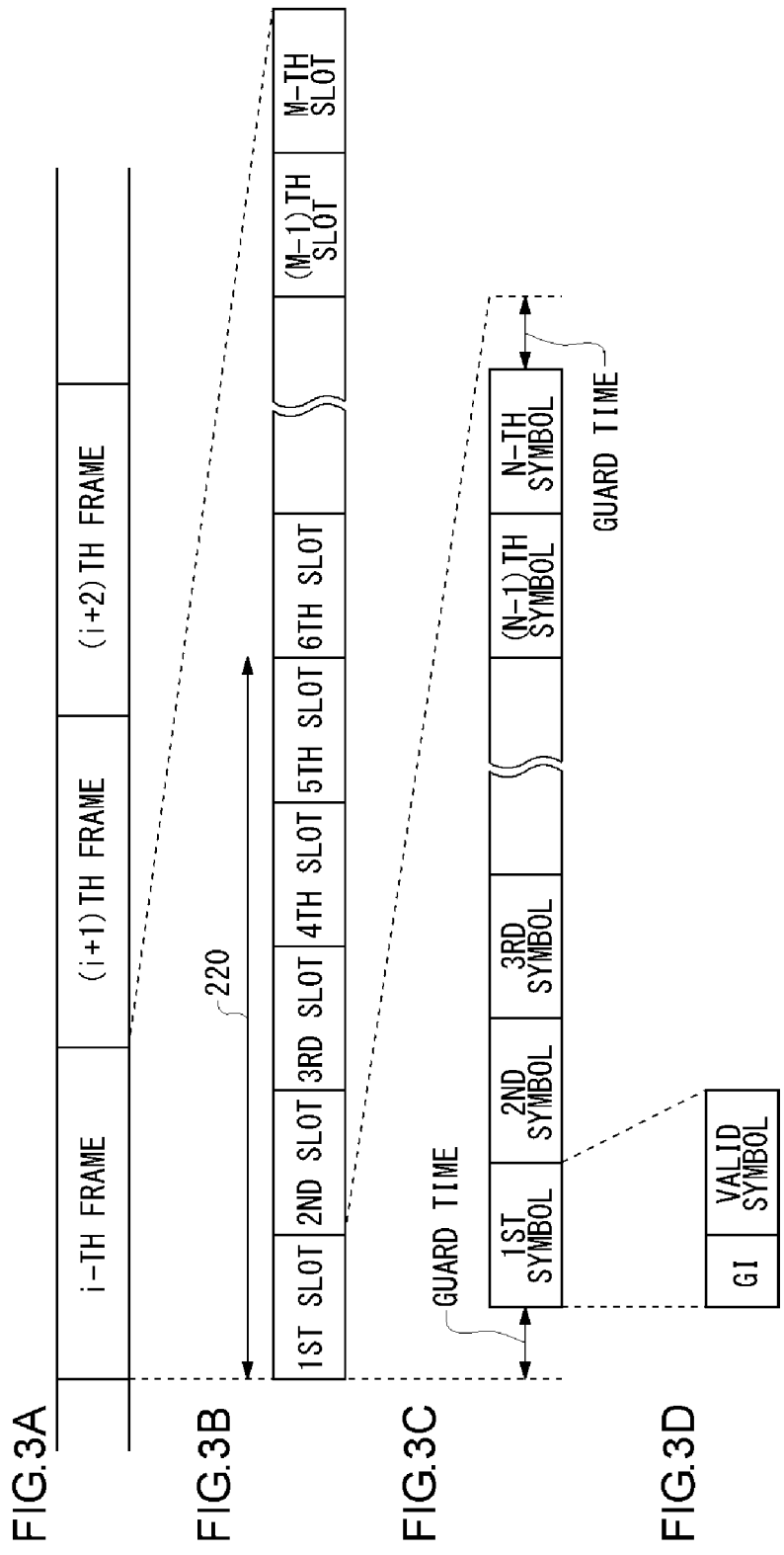

FIG.4A

| | | | | | | | |
|---|---|---|---|---|---|---|---|
| 31 | N | N | N | -1 | D | D | D |
| 30 | N | N | N | -2 | N | N | N |
| 29 | N | N | N | -3 | D | D | D |
| 28 | N | N | N | -4 | D | D | D |
| 27 | N | N | N | -5 | D | D | D |
| 26 | D | D | D | -6 | D | D | D |
| 25 | D | D | D | -7 | P | P | P |
| 24 | D | D | D | -8 | D | D | D |
| 23 | D | D | D | -9 | D | D | D |
| 22 | D | D | D | -10 | D | D | D |
| 21 | P | P | P | -11 | D | D | D |
| 20 | D | D | D | -12 | D | D | D |
| 19 | D | D | D | -13 | D | D | D |
| 18 | D | D | D | -14 | D | D | D |
| 17 | D | D | D | -15 | D | D | D |
| 16 | D | D | D | -16 | D | D | D |
| 15 | D | D | D | -17 | D | D | D |
| 14 | D | D | D | -18 | D | D | D |
| 13 | D | D | D | -19 | D | D | D |
| 12 | D | D | D | -20 | D | D | D |
| 11 | D | D | D | -21 | P | P | P |
| 10 | D | D | D | -22 | D | D | D |
| 9 | D | D | D | -23 | D | D | D |
| 8 | D | D | D | -24 | D | D | D |
| 7 | P | P | P | -25 | D | D | D |
| 6 | D | D | D | -26 | N | N | N |
| 5 | D | D | D | -27 | N | N | N |
| 4 | D | D | D | -28 | N | N | N |
| 3 | D | D | D | -29 | N | N | N |
| 2 | N | N | N | -30 | N | N | N |
| 1 | D | D | D | -31 | N | N | N |
| 0 | N | N | N | -32 | N | N | N |

| | | | | | | | | |
|---|---|---|---|---|---|---|---|---|
| 31 | N | N | N | −1 | N | N | N | |
| 30 | N | N | N | −2 | N | N | N | |
| 29 | N | N | N | −3 | D | D | D | |
| 28 | N | N | N | −4 | D | D | D | |
| 27 | N | N | N | −5 | D | D | D | |
| 26 | D | D | D | −6 | D | D | D | |
| 25 | D | D | D | −7 | P | P | P | |
| 24 | D | D | D | −8 | D | D | D | |
| 23 | D | D | D | −9 | D | D | D | |
| 22 | D | D | D | −10 | D | D | D | |
| 21 | P | P | P | −11 | D | D | D | |
| 20 | D | D | D | −12 | D | D | D | |
| 19 | D | D | D | −13 | D | D | D | |
| 18 | D | D | D | −14 | D | D | D | |
| 17 | D | D | D | −15 | D | D | D | ... |
| 16 | D | D | D | −16 | D | D | D | |
| 15 | D | D | D | −17 | D | D | D | |
| 14 | D | D | D | −18 | D | D | D | |
| 13 | D | D | D | −19 | D | D | D | |
| 12 | D | D | D | −20 | D | D | D | |
| 11 | D | D | D | −21 | P | P | P | |
| 10 | D | D | D | −22 | D | D | D | |
| 9 | D | D | D | −23 | D | D | D | |
| 8 | D | D | D | −24 | D | D | D | |
| 7 | P | P | P | −25 | D | D | D | |
| 6 | D | D | D | −26 | N | N | N | |
| 5 | D | D | D | −27 | N | N | N | |
| 4 | D | D | D | −28 | N | N | N | |
| 3 | D | D | D | −29 | N | N | N | |
| 2 | N | N | N | −30 | N | N | N | |
| 1 | N | N | N | −31 | N | N | N | |
| 0 | N | N | N | −32 | N | N | N | |

BROADCASTING METHOD, ACCESS CONTROL APPARATUS, AND TERMINAL APPARATUS

RELATED APPLICATIONS

This application is the U.S. National Phase under 35 U.S.C. § 371 of International Application No. PCT/JP2009/007175, filed on Dec. 24, 2009, which in turn claims the benefit of Japanese Application Nos. 2008-330966, filed on Dec. 25, 2008 and 2008-330967 filed on Dec. 25, 2008, the disclosures of which Applications are incorporated by reference herein.

TECHNICAL FIELD

The present invention relates to a broadcasting technology and, more particularly, to a broadcasting method for sending signals containing predetermined information, an access control apparatus, and a radio apparatus.

BACKGROUND TECHNOLOGY

Road-to-vehicle communication has been under investigation in an effort to prevent collision accidents of vehicles on a sudden encounter at an intersection. In a road-to-vehicle communication, information on conditions at an intersection is communicated between a roadside unit and an in-vehicle unit. Such a road-to-vehicle communication requires installation of roadside units, which means a great cost of time and money. In contrast to this, a vehicle-to-vehicle (inter-vehicular) communication, in which information is communicated between in-vehicle units, has no need for installation of roadside units. In that case, current position information is detected in real time by GPS (Global Positioning System) or the like and the position information is exchanged between the in-vehicle units. Thus it is determined on which of the roads leading to the intersection the driver's vehicle and the other vehicles are located (See Patent Document 1, for instance).

PRIOR ART DOCUMENTS

Patent Documents

[Patent Document 1] Japanese Unexamined Patent Application Publication No. 2005-202913.

DISCLOSURE OF THE INVENTION

Problems to be Solved by the Invention

Used in wireless LANs (Local Area Networks) conforming to standards, such as IEEE 802.11, is an access control function called Carrier Sense Multiple Access with Collision Avoidance (CSMA/CA). In such a wireless LAN, therefore, the same wireless channel is shared by a plurality of terminal apparatuses. Such CSMA/CA is subject to conditions involving mutual wireless signals not reaching the targets, namely, carrier sense not functioning, due to the effects of distance between the terminal apparatuses or obstacles attenuating the radio waves and so forth. When the carrier sense does not function, there occur collisions of packet signals transmitted from a plurality of terminal apparatuses. Also, wireless LANs employ the OFDM modulation scheme to achieve faster communication speed.

On the other hand, when a wireless LAN is applied to the inter-vehicular communication, a need arises to transmit information to a large indefinite number of terminal apparatuses, and therefore it is desirable that signals be sent by broadcast. Yet, at an intersection or like places, an increase in the number of vehicles, that is, the number of terminal apparatuses, is considered to cause an increase in the collisions of the packet signals therefrom. In consequence, data contained in the packet signals may not be transmitted to the other terminal apparatuses. If such a condition occurs in the inter-vehicular communication, then the objective of preventing collision accidents of vehicles on a sudden encounter at an intersection will not be attained.

The present invention has been made in view of the foregoing circumstances, and a purpose thereof is to provide a technology for reducing the collision probability of packet signals under conditions of increased volume of communication.

Means for Solving the Problems

In order to resolve the above problems, a radio apparatus according to one embodiment of the present invention includes: a generator configured to generate timing information on timing with which each of radio apparatuses is to synchronize in communication between the radio apparatuses when the each of radio apparatuses broadcasts a signal; and a broadcasting unit configured to broadcast the timing information generated by the generator. The generator may further generate cycle information on a broadcast cycle in which each of the radio apparatuses broadcasts the signal, in communication between the radio apparatuses, and the broadcasting unit may broadcast the cycle information generated by the generator, together with the timing information.

Another embodiment of the present invention relates to a broadcasting method. This method includes: generating timing information on timing with which each of radio apparatuses is to synchronize in communication between the radio apparatuses when the each of radio apparatuses broadcasts a signal; and broadcasting the generated timing information. The generating may generate cycle information on a broadcast cycle in which each of the radio apparatuses broadcasts the signal, in communication between the radio apparatuses. The broadcasting may broadcast the generated cycle information, together with the timing information.

Still another embodiment of the present invention relates to a radio apparatus. This apparatus includes: a receive unit configured to receive, from an access control apparatus for controlling communication between radio apparatuses, timing information on timing with which each of the radio apparatuses is to synchronize when each thereof broadcasts a signal; a decision unit configured to determine the timing synchronized with the timing information received by the receive unit, the timing arriving in a predetermined cycle; and a broadcasting unit configured to broadcast the signal with the timing determined by the decision unit. The receive unit may further receive, from the access control apparatus, cycle information on a broadcast cycle in which each of the radio apparatuses broadcasts the signal, and the decision unit may adjust the timing so that the timing arrives in the broadcast cycle according to the cycle information received by the receive unit.

Still another embodiment of the present invention relates to a broadcasting method. This method includes: receiving, from an access control apparatus for controlling communication between radio apparatuses, timing information on timing with which each of the radio apparatuses is to synchronize when the each of radio apparatuses broadcasts a signal; determining timing synchronized with the received timing information, the timing arriving in a predetermined cycle; broadcasting the signal with the determined timing; further receiving, from the access control apparatus, cycle information on a broadcast cycle in which each of the radio apparatuses broadcasts the signal; adjusting the timing so that the timing arrives with the broadcast cycle according to the received cycle information; and broadcasting the signal with the adjusted timing.

Optional combinations of the aforementioned constituting elements, and implementations of the invention in the form of methods, apparatuses, systems, recording media, computer programs and so forth may also be practiced as additional modes of the present invention.

Effect of the Invention

The present invention reduces the collision probability of packet signals under conditions of increased volume of communication.

BRIEF DESCRIPTION OF THE DRAWINGS

FIGS. 3A to 3D show formats of frames generated by a frame generator of FIG. 2.

FIGS. 4A and 4B show formats of OFDM symbol used in the communication system of FIG. 1.

BEST MODE FOR CARRYING OUT THE INVENTION

Figure 1:
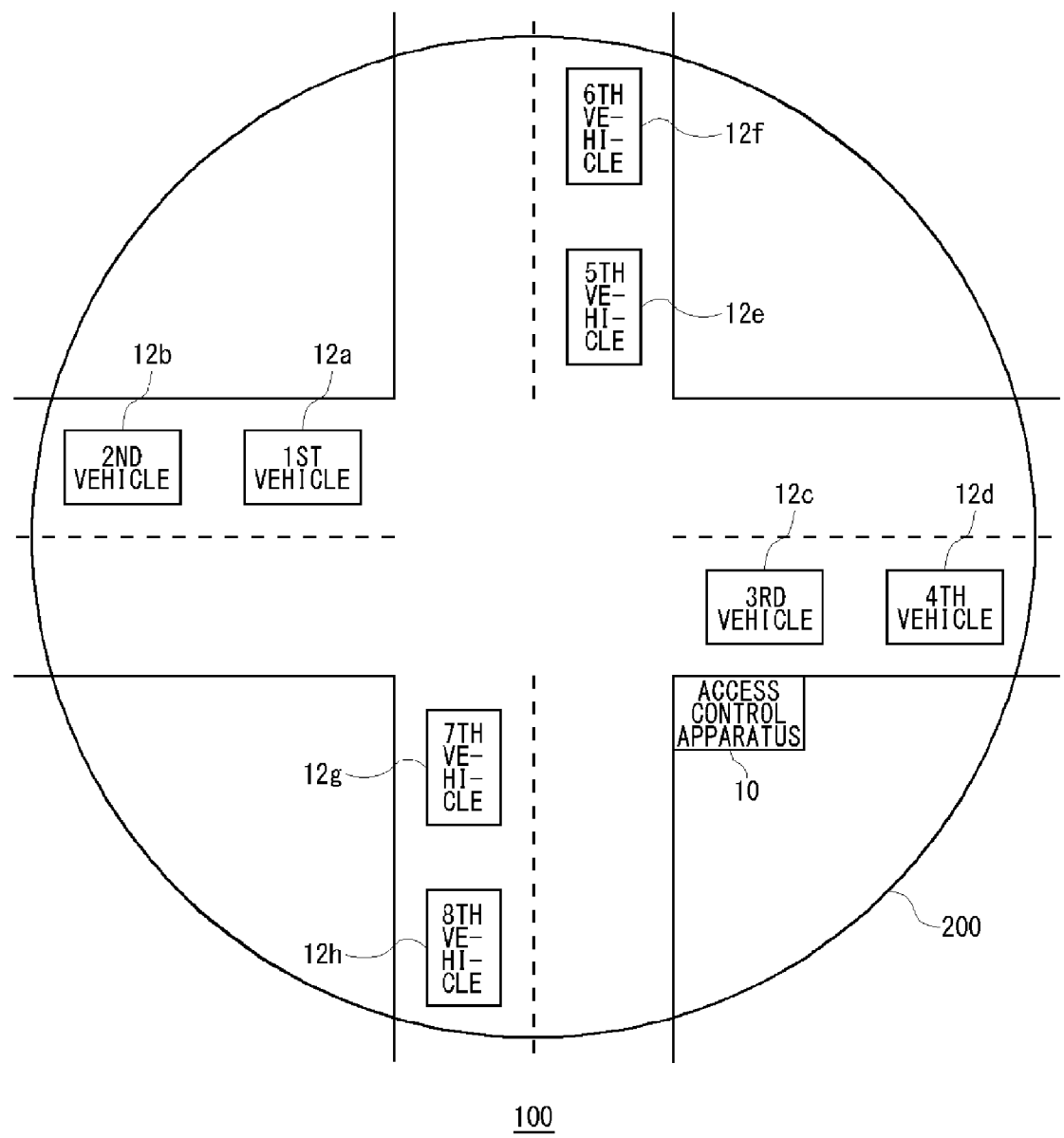
FIG. 1 shows a structure of a communication system according to an exemplary embodiment of the present invention.

The present invention will be outlined before it is explained in detail. Exemplary embodiments of the present invention relate to a communication system carrying out data communication between terminal apparatuses installed in vehicles. A terminal apparatus transmits, by broadcast, packet signals containing information such as the traveling speed and position of a vehicle (hereinafter referred to as "data"). And the other terminal apparatuses receive the packet signals and recognize the approach or the like of the vehicle based on the data. Note here that the terminal apparatuses employ the OFDM modulation scheme to achieve faster communication speed. Under these circumstances, an increase in the number of terminal apparatuses at an intersection or like place increases the probability of packet signals occurring. To cope with it, the communication system according to the present exemplary embodiment executes the following processes.

The communication system according to the present exemplary embodiment includes an access control apparatus in addition to a plurality of terminal apparatuses, and the access control apparatus is installed at an intersection, for instance. The access control apparatus repeatedly specifies a frame containing a plurality of slots. Note that one or more of the plurality of slots contained in each frame are reserved and secured as control slots. Also, the access control apparatus identifies control slots to be used, and adds information on timings of the control slots and information with which to identify said access apparatus (hereinafter referred to as "identification information") to control information. Also, the access control apparatus transmits, by broadcast, a packet signal containing the control information (hereinafter referred to sometimes as "control information" also) using the control slots. Here, the information on timings of the control slots is, for instance, information on which slot number, starting from the beginning of a frame, the control slot is assigned to (this information will be referred to as "control slot information").

A terminal apparatus receives the control information and thereby generates a frame corresponding to the control information. The thus generated frame contains a plurality of slots as well. Also, the terminal apparatus recognizes slots, in the plurality of slots contained in the frame, which are other than the control slots. Note that in the description of terminal apparatuses given hereunder the slots sometimes mean those excluding the control slots. Each terminal apparatus performs carrier sensing on a plurality of slots, respectively, and thereby it estimates a slot which is not used by other terminal terminals (hereinafter referred to as "empty slot" or "unused slot"). There may be a plurality of such empty slots. The terminal apparatus selects at random one slot to be used for the transmission of data from among empty slots. The terminal apparatus transmits, by broadcast, a packet signal containing data (hereinafter referred to sometimes as "data" also) using the selected slot.

The terminal apparatus uses a relatively identical slot for a plurality of frames. Under such a circumstance, an increase in the number of terminal apparatuses transmitting the data, namely an increase in the traffic volume, increases the probability of data collisions occurring. To cope with this problem, the access control apparatus measures the traffic volume and determines the broadcast cycle of data according to the measured traffic volume. The broadcast cycle is indicated by "1 frame", "2 frames", "3 frames" or the like, for instance. Also, the access control apparatus broadcasts frames by adding information on the determined "broadcast cycle" (hereinafter referred to as "cycle information") to the control information. Each terminal apparatus sets the broadcast cycle based on the cycle information.

Note here that the access control apparatus has no direct involvement in data communication between terminal apparatuses, that is, the access control apparatus does not directly specify the slot to be used in the data communication. In other words, the access control apparatus only conveys the construction of a frame containing slots to be used by a plurality of terminal apparatus. The terminal apparatus performs data communication with timings of slots contained in the frame notified by the access control apparatus. That is, the access control apparatus controls the communications between a plurality of terminal apparatuses.

It is to be noted that since the control information is also transmitted in a single slot, there are chances that the data transmitted from a terminal apparatus incapable of receiving the control information may collide with the control information. In consequence, if the other terminal apparatuses cannot receive the control information, then there arises a difficulty of carrying out the aforementioned processes. To cope with this situation, the OFDM signals used in transmitting data have some of the subcarriers as null carriers in which no data is contained (these subcarriers being hereinafter referred to as "identification carriers"). On the other hand, the OFDM signals used in transmitting control information have signals placed in the identification carriers, too. Hence, even when there is a collision between data and control information, the terminal apparatus can detect the presence of control information by observing the signal components of the identification carrier.

Further, if a plurality of access apparatuses are installed at an intersection where they are located close to each other, interference between them must be taken into consideration. If, for instance, the control information transmitted by broadcast from the plurality of access control apparatuses interfere with each other, the terminal apparatuses may not be able to receive the control information and therefore the aforementioned processes will not be achieved. Though such interference can be avoided by assigning a different frequency channel to each access control apparatus, another separate structure to reduce the interference will be needed if no other frequency channel can be provided. To cope with this, a plurality of control slots are reserved and secured as described above. Each access control apparatus performs carrier sensing on a plurality of control slots, respectively, and thereby it selects one control slot and transmits, by broadcast, the control information using the selected control slot.

FIG. 1 shows a structure of a communication system 100 according to an exemplary embodiment of the present invention. FIG. 1 corresponds to a case thereof at an intersection viewed from above. The communication system 100 includes an access control apparatus 10 and a first vehicle 12a, a second vehicle 12b, a third vehicle 12c, a fourth vehicle 12d, a fifth vehicle 12e, a sixth vehicle 12f, a seventh vehicle 12g, and an eighth vehicle 12h, which are generically referred to as "vehicle 12" or "vehicles 12". It is to be noted that each vehicle 12 has a not-shown terminal apparatus installed therein. Also, an area 200 is formed by the access control apparatus 10.

As shown in FIG. 1, a road extending in the horizontal, or left-right, direction and a road extending in the vertical, or up-down, direction in FIG. 1 intersect with each other in the central portion thereof. Note here that the upper side of FIG. 1 corresponds to the north, the left side thereof the west, the down side thereof the south, and the right side thereof the east. And the portion where the two roads intersect each other is the intersection. The first vehicle 12a and the second vehicle 12b are advancing from left to right, while the third vehicle 12c and the fourth vehicle 12d are advancing from right to left. Also, the fifth vehicle 12e and the sixth vehicle 12f are advancing downward, while the seventh vehicle 12g and the eighth vehicle 12h are advancing upward.

The terminal apparatus installed in each of the vehicles 12 acquires data and transmits, by broadcast, a packet signal containing the data. Here, before explaining exemplary embodiments of the present invention, a description will be given of an operation of a terminal apparatus which is compatible with a known wireless LAN, i.e., CSMA/CA. Each terminal apparatus transmits data by broadcast when it has determined by executing carrier sense that transmission is possible. Consequently, there are chances of data from a plurality of terminal apparatuses colliding with each other. Also, as the number of terminal apparatuses increases, there will be greater probability of collisions occurring. In particular, at locations like intersections, the likelihood of data collision is greater despite the fact that the likelihood of vehicles 12 colliding with each other is also great. This means failed utilization of data in spots where data is in the greatest demand.

Therefore, the communication system 100 places an access control apparatus 10 at each intersection. The access control apparatus 10 repeatedly generates a frame containing a plurality of slots, based on the signals received from not-shown GPS satellites. Here, one or more of the plurality of slots correspond to the control slots. The access control apparatus 10 adds the control slot information and the identification information to the control information. Further, the access control apparatus 10 broadcasts the control information, using control slots. The selection of the control slot(s) will be discussed later.

A plurality of terminal apparatuses receive the control information broadcast by the access control apparatus 10 and generate frames based on the control information. As a result, the frame generated by each of the plurality of terminal apparatuses is synchronized with the frame generated by the access control apparatus 10. Thus, slots generated by the respective plurality of terminal apparatuses are synchronized with each other. Each terminal apparatus performs carrier sensing in a plurality of slots, respectively, and estimates empty slots. Also, the terminal apparatus randomly selects one slot out of the empty slots. Also, the terminal apparatus broadcasts data using the selected slot. The terminal apparatus continues to select the same slots in corresponding timing in each frame, for a plurality of frames.

The access control apparatus 10 measures the traffic volume in the communications between the terminal apparatuses. Also, the access control apparatus 10 determines a cycle in which the terminal apparatus broadcasts data (hereinafter referred to as "broadcast cycle"), based on the traffic volume. Also, the access control apparatus 10 broadcasts frames by adding the information on a cycle, namely the aforementioned cycle information, to the control information. The terminal apparatus sets the broadcast cycle based on the cycle information contained in the control information. The Terminal apparatus broadcasts the data using the aforementioned selected empty slot in the frame according to the broadcast cycle. It is to be appreciated that the terminal apparatus can broadcast data even when the terminal apparatus is not receiving control information. The terminal apparatus which has received data from the other terminal apparatuses recognizes, based on the data, the presence of vehicles 12 that are carrying the other terminal apparatuses.

Note here that both the control information broadcast from the access control apparatus 10 and the data broadcast from the terminal apparatuses use OFDM signals. However, it is not the same subcarriers in which the control information and the data are placed. The data is not placed in the aforementioned identification carriers. On the other hand, identification information is placed not only in the subcarriers where the data is placed but also in the identification carriers. As a result, even when there is a collision between data and identification information, the terminal apparatus can detect the presence of control information by observing the signal components of identification carriers. It should be noted that the aforementioned detection of entry into the area 200 by the terminal apparatus may be made relative to the identification carriers.

Figure 2:
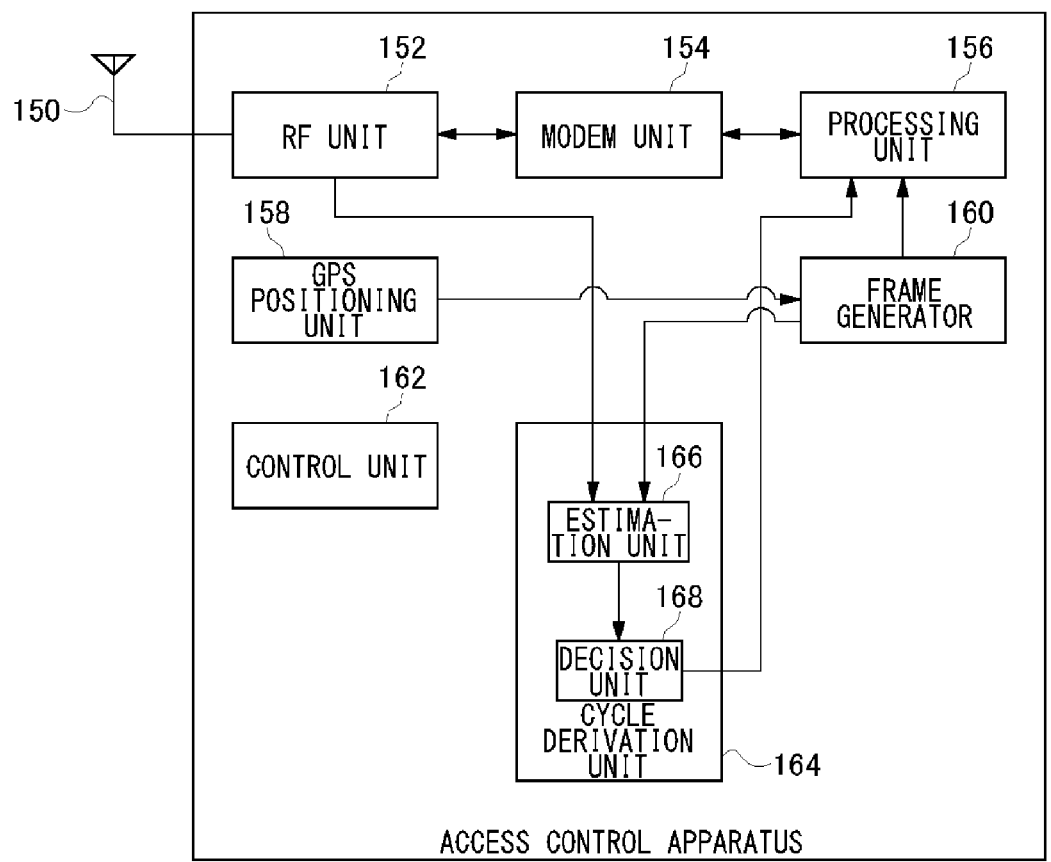
FIG. 2 shows a structure of an access control apparatus of FIG. 1.

FIG. 2 shows a structure of the access control apparatus 10. The access control apparatus 10 includes an antenna 150, an RF unit 152, a modem unit 154, a processing unit 156, a GPS positioning unit 158, a frame generator 160, a control unit 162, and a cycle derivation unit 164. The cycle derivation unit 164 includes an estimation unit 166 and a decision unit 168. The GPS positioning unit 158 receives signals from not-shown GPS satellites and acquires information on the time of day based on the received signals. It should be noted that known art can be used for the acquisition of information on the time of day and therefore the description thereof is omitted here. The GPS positioning unit 158 outputs the information on the time of day to the frame generator 160.

The frame generator 160 acquires information on the time of day from the GPS positioning unit 158. The frame generator 160 generates a plurality of frames based on the information on the time of day. For example, the frame generator 160 generates ten "100 msec" frames by dividing a duration of "1 sec" into 10 parts from the timing of "0 msec". Frames are thus defined and specified repeatedly through the repetition of this process. Also, the frame generator 160 generates a plurality of slots by dividing each frame into a plurality of parts. For example, dividing a frame into 200 parts generates 200 slots with each slot being "500 μsec" long.

Here, one or more of a plurality of slots contained in each frame is/are reserved as "control slots". For example, first five slots from the beginning of 200 slots contained in each frame are control slots. Also, the control slot is a slot used when the access control apparatus 10 broadcasts control information. The remaining slots of the plurality of slots in each frame are reserved and secured for the communications between not-shown terminal apparatuses. As previously indicated, since the communication system 100 employs the OFDM modulation scheme, each slot is so specified as to be composed of a plurality of OFDM symbols. Also, an OFDM symbol comprises a guard interval (GI) and a valid symbol. Note that a guard time may be provided in the front portion and the rear portion of each slot. It is to be noted also that a certain group of or combination of a plurality of OFDM symbols contained in a slot is equivalent to the packet signal mentioned earlier.

FIGS. 3A to 3D show the formats of frames generated by the frame generator 160. FIG. 3A shows a structure of frames. As shown in FIG. 3A, a plurality of frames, such as i-th frame to (i+2)th frame, are so specified as to be repeated. Also, the duration of each frame is "100 msec", for instance. FIG. 3B shows a structure of a single frame. As shown in FIG. 3B, a single frame consists of M units of slots. For example, M is "200" and the duration of each slot is "500 μsec". Also, slots assigned to the beginning part of each frame correspond to the control slots, and an interval where the control slots are assigned is indicated as a control region 220.

In this case, five slots which are a first slot to a fifth slot are contained in the control region 220 as the control slots. FIG. 3C shows a structure of a single slot. As shown in FIG. 3C, a guard time may be provided in the front portion and the rear portion of each slot. And the remaining duration of the slot consists of N units of OFDM symbols. FIG. 3D shows a structure of each OFDM symbol. As shown in FIG. 3D, each OFDM symbol consists of a GI and a valid symbol. Let us now refer back to FIG. 2.

The RF unit 152 receives through the antenna 150 a packet signal transmitted in communication between the other terminal apparatuses (not shown) in each slot, as a receiving processing. Here, the packet signal is sent from a terminal apparatus. The RF unit 152 performs a frequency conversion on the packet signal of a radiofrequency received through the antenna 150 and thereby generates a packet signal of baseband. Further, the RF unit 152 outputs the baseband packet signal to the modem unit 154. Generally, a baseband packet signal is formed of an in-phase component and a quadrature component, and therefore it should be represented by two signal lines. However, it is represented by a single signal line here to make the illustration clearer for understanding.

Also, the RF unit 152 includes an LNA (Low Noise Amplifier), a mixer, an AGC (Automatic Gain Control) unit, and an A-D conversion unit. The RF unit 152 performs a frequency conversion on the baseband packet signal inputted from the modem unit 154 and thereby generates a radiofrequency packet signal in each slot as a transmission processing. Further, the RF unit 152 transmits, through the antenna 150, the radiofrequency packet signal. The RF unit 152 also includes a PA (Power Amplifier), a mixer, and a D-A conversion unit.

The modem unit 154 demodulates the baseband packet signal fed from the RF unit 152, as a receiving processing. Further, the modem unit 154 outputs the demodulation result to the processing unit 156. Also, the modem unit 154 modulates the data fed from the processing unit 156, as a transmission processing. Further, the modem unit 154 outputs the modulation result to the RF unit 152 as a baseband packet signal. It is to be noted here that the communication system 100 is compatible with the OFDM modulation scheme and therefore the modem unit 154 performs FFT (Fast Fourier Transform) as a receiving processing and performs IFFT (Inverse Fast Fourier Transform) as a transmission processing also.

The processing unit 156 receives information on the timing of a frame and the timings of slots contained in the frame, from the frame generator 160. The processing unit 156 identifies the timings of control slots contained in a plurality of slots contained in the frame. In the case of FIG. 3A, the five control slots contained in the control region 220 are identified. The processing unit 156 performs carrier sensing on each slot via the antenna 150, the RF unit 152 and the modem unit 154. Known art can be used as the carrier sensing and therefore the description thereof is omitted here. It is appreciated that the processing unit 156 may receive the received signals from the RF unit 152 without the signals being passed through the modem unit 154. The processing unit 156 selects one control slot out of the five control slots based on the carrier sensing result. For example, the control slot having the minimum interference power is selected.

The processing unit 156 generates information on the selected control slot. Also, the processing unit 156 generates control information by adding the control slot information and the identification information thereto. The processing unit 156 assigns the control information to the selected control slot. The processing unit 156 outputs the control information to the modem unit 154, using the assigned control slot. Transmitting the control information using the control slot assigned by the communication system 100 is equivalent to notifying the timing of control slots in a frame. Since the relative position of control slots in a frame is contained in the control slot information, said transmitting the control information using the control slot assigned by the communication system 100 is also equivalent to notifying the timing of the frame. Here, the timing of frame corresponds to the timing to be synchronized when each terminal apparatus transmits data in the communications between the terminal apparatuses.

As described above, the communication system 100 is compatible with the OFDM modulation scheme and therefore the processing unit 156 generates the control information as an OFDM signal. Note here that the OFDM signals are also used for the communications between a not-shown plurality of terminal apparatuses. A description is given herein by comparing an OFDM signal that has the control information assigned (hereinafter this is sometimes called "control information" also) with an OFDM signal that has data assigned (hereinafter this is sometimes called "data" also). FIGS. 4A and 4B illustrate formats of OFDM symbols used in the communication system 100. FIG. 4A corresponds to control information, whereas FIG. 4B corresponds to data.

In both FIG. 4A and FIG. 4B, the vertical direction represents the frequency, whereas the horizontal direction represents time. The numbers "31", "30", . . . , "−32" are indicated from top along the vertical direction, and these are the numbers assigned to identify subcarriers (hereinafter referred to as "subcarrier numbers"). In OFDM signals, the frequency of a subcarrier whose subcarrier number is "31" is the highest, whereas the frequency of a subcarrier whose subcarrier number is "−32" is the lowest. In FIG. 4A and FIG. 4B, "D" corresponds to a data symbol, "P" a pilot symbol, and "N" a null.

What are common to the control information and the data are the subcarrier numbers "31" to "27", "2", "0", and "−2", and the subcarrier numbers "−26" to "−32" which are all null. In the control information, the subcarrier numbers "26" to "3", "−3" to "−25" are also used in data, and the use of symbols is the same for both the control information and the data. In the control information, on the other hand, the subcarrier numbers "1" and "−1" are not used for data. These correspond to the aforementioned identification carriers. That is, the identification carrier is assigned to a subcarrier near the center frequency of an OFDM signal. In the control information, a guard band is provided between a subcarrier used also for data and the identification carrier, namely between the subcarrier number "2" and the subcarrier number "−2". The subcarriers of the subcarrier number "−2" through the subcarrier number "2" may be collectively called "identification carrier" or "identification carriers".

Here, the processing unit 156 assigns the information on frames and the slot numbers to the identification carrier. Also, the processing unit 156 preferentially assign information having higher degrees of importance to the identification carrier. Also, a known signal is assigned to an OFDM symbol which is located anterior to the packet signal. Such a known signal is used for AGC (Automatic Gain Control) or used to estimate the channel characteristics. The processing unit 156 may assign a known signal to the identification carrier over a partial period of a predetermined slot. Such a known signal is used as a unique word (UW), for example. Let us now refer back to FIG. 2.

The modem unit 154 and the RF unit 152 transmit, by broadcast, the control information generated by the processing unit 156 from the antenna 150, using the control slots. One of the destinations of the control information is a terminal apparatus. The terminal apparatus having received the control information recognizes the timing of each slot and uses at least one of the remaining slots reserved for the communications between terminal apparatuses. If the terminal apparatus broadcasts the data over a plurality of frames, the terminal apparatus will use the same slots in corresponding timing in each frame.

The estimation unit 166 receives the input of signals broadcast from each terminal apparatus, via the antenna 150 and the RF unit 152. The estimation unit 166 measures the received power slot by slot. Also, the estimation unit 166 stores a threshold value in advance and compares the received power of each slot against the threshold value. If the received value is greater than the threshold value, the estimation unit 166 will determine that the slot is "in use". As a result, the estimation unit 166 acquires the ratio or the number of slots in use (hereinafter referred to as "in-use slots") over or in a plurality of slots contained in each frame. This corresponds to estimating the traffic volume in communication between the terminal apparatuses.

The decision unit 168 determines the broadcast cycle based on the traffic volume estimated by the estimation unit 166, namely based on the ratio of in-use slots or the number of in-use slots. A description is given herein of a case where the broadcast cycle is determined based on the ratio of in-use slots. The ratio of in-use slots is derived by dividing the number of in-use slots per frame by the total number of slots. Here, the total number of slots corresponds to the total number of slots contained in each frame or the number of slots obtained when the number of control slots is subtracted from the total number of slots.

The decision unit 168 stores beforehand, as two threshold values, a threshold value serving as a reference for extending the broadcast cycle (hereinafter referred to as "extending threshold value") and a threshold serving as a reference for reducing the broadcast cycle (hereinafter referred to as "reducing threshold value"). The two threshold values are defined such that the extending threshold value is larger than the reducing threshold value. For example, the extending threshold value is set to "80%" and the reducing threshold value to "30%". The decision unit 168 compares the ratio of in-use slots against the extending threshold value and the reducing threshold value.

If the ratio of in-use slots is larger than the extending threshold value, the decision unit 168 will determine the extension of the broadcast cycle. For example, the decision unit 168 determines the extension of the broadcast cycle by one frame; if the present broadcast cycle is "two frames", the decision unit 168 will determine the change of the broadcast cycle to "three frames". If, on the other hand, the ratio of in-use slots is smaller than the reducing threshold value, the decision unit 168 will determine the reduction of the broadcast cycle by one frame; if the present broadcast cycle is "three frames", the decision unit 168 will determine the change of the broadcast cycle to "two frames". It is appreciated that the maximum value of the broadcast cycle may be set to "five frames" in extending the broadcast cycle, for example. If the present broadcast cycle is a maximum value, the decision unit 168 will not extend the broadcast cycle further than the maximum value. Also, if the present broadcast cycle is "one frame", the decision unit 168 will not reduce the broadcast cycle than "one frame". Note that the decision unit 168 may increase the broadcast cycle by an integral multiple of the present broadcast cycle or decrease by a reciprocal of an integral multiple thereof. The decision unit 168 outputs the thus determined broadcast cycle to the processing unit 156.

As the processing unit 156 receives the broadcast cycle from the decision unit 168, the processing unit 156 generates cycle information on the broadcast cycle. The processing unit 156 also adds this cycle information to the control information so as to be stored therein. As a result, the cycle information is broadcast as well. It is to be noted here that the processing unit 156 may further generate constraint information on a terminal apparatus to be controlled by the cycle information. For example, the processing unit 156 generates, as the constraint information, positional information on the present position where the terminal apparatus to be controlled should be located. The positional information is so generated as to indicate a partial region of the area 200 of FIG. 1. The terminal apparatus located in this region adjusts the broadcast cycle according to the cycle information. On the other hand, a terminal apparatus not located in this region uses a predetermined broadcast cycle without having to conform to the cycle information.

The processing unit 156 also generates moving rate information on the traveling speed at which the terminal apparatus to be controlled moves. The moving rate information may be defined as a value of a distance traveled per hour (hereinafter referred to as "hourly moving rate threshold value"), for instance. A terminal apparatus traveling at a speed slower than the hourly moving rate threshold value adjusts the broadcast cycle according to the cycle information. On the other hand, a terminal apparatus traveling faster than the hourly moving rate threshold value uses a predetermined broadcast cycle without having to conform to the cycle information. It is to be further noted that a period of validity of the cycle information may be contained in the control information as validity information. The control unit 162 controls the entire processing of the access control apparatus 10.

These structural components may be implemented hardwarewise by elements such as a CPU, memory and other LSIs of an arbitrary computer, and softwarewise by memory-loaded programs or the like. Depicted herein are functional blocks implemented by cooperation of hardware and software. Therefore, it will be obvious to those skilled in the art that the functional blocks may be implemented by a variety of manners including hardware only, software only or a combination of both.

Figure 5:
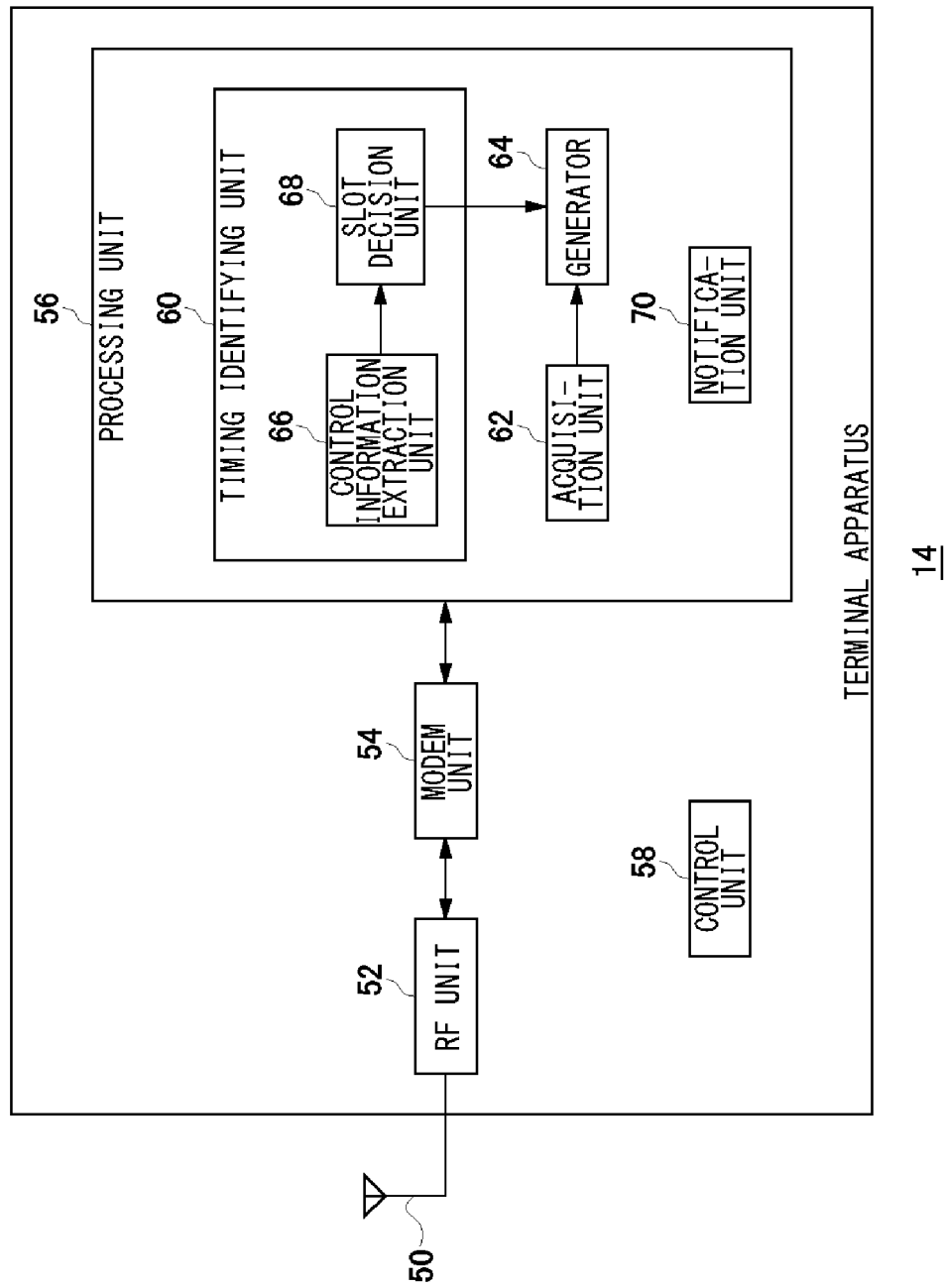
FIG. 5 shows a structure of a terminal apparatus mounted on a vehicle of FIG. 1.

FIG. 5 shows a structure of a terminal apparatus 14 mounted on a vehicle 12. The terminal apparatus 14 includes an antenna 50, an RF unit 52, a modem unit 54, a processing unit 56, and a control unit 58. The processing unit 56 includes a timing identifying unit 60, an acquisition unit 62, a generator 64, and a notification unit 70. The timing identifying unit 60 includes a control information extraction unit 66 and a slot decision unit 68. The antenna 50, the RF unit 52 and the modem unit 54 carry out the processings similar to those carried out by the antenna 150, the RF unit 152 and the modem unit 154 of FIG. 2, respectively. Thus, the repeated description thereof is omitted here.

The acquisition unit 62 includes a GPS receiver, a gyroscope, a vehicle speed sensor, and so forth all of which are not shown in FIG. 5. The acquisition unit 62 acquires the present position, traveling direction, traveling speed and so forth of a not-shown vehicle 12, namely the vehicle 12 carrying the terminal apparatus 14, based on data supplied from the aforementioned not-shown components of the acquisition unit 62. The present position thereof is indicated by the latitude and longitude. Known art may be employed to acquire them and therefore the description thereof is omitted here. The acquisition unit 62 outputs the thus acquired information to the generator 64.

The control information extraction unit 66 receives the demodulation result fed from the modem unit 54. Of the demodulation result, the control information extraction unit 66 monitors a part of subcarriers corresponding to the identification carrier. If valid data is contained in the part of subcarriers corresponding to the identification carrier, the control information extraction unit 66 will recognize that the control information extraction unit 66 is receiving a slot containing the control information therein, namely a control slot. Also, the control information extraction unit 66 establishes the synchronization between frames and slots when the timing with which the slot containing the control information is received is used as a reference.

More specifically, the control information extraction unit 66 identifies the control slots where the received demodulation result is assigned, based on the control slot information contained in the control information. Then the control information extraction unit 66 generates frames with this identified control slot as a reference. If the control information corresponds to a third slot as shown in the FIG. 3B, the control information extraction unit 66 will generate frames with the third slot as a reference. In other words, the control information extraction unit 66 generates frames each containing a plurality of slots in such a manner as to synchronize with the frame corresponding to the control slot information. This corresponds to that the control information extraction unit 66 extracts, from the control information, information on the timing of a frame and the timings of slots contained in the frame.

The control information extraction unit 66 also extracts the cycle information contained in the control information. As previously described, the broadcast cycle associated with the cycle information is determined according to the traffic volume in communication between the terminal apparatuses. If the constraint information and/or the validity information are/is contained in the control information, the control information extraction unit 66 will output the constraint information and/or the validity information as well. The control information extraction unit 66 outputs information on the generated frames to the slot decision unit 68. Further, the control information extraction unit 66 also outputs the cycle information, the constraint information and the validity information to the slot decision unit 68.

The slot decision unit 68 measures, by carrier sensing, the interference power for each of a plurality of slots contained in the frame generated by the control information extraction unit 66. Also, the slot decision unit 68 estimates empty slots based on the interference powers. More specifically, the slot decision unit 68 stores a predetermined threshold value in advance, and compares the interference power at each slot against the threshold value. If the slot decision unit 68 estimates slots whose interference powers are below the threshold value, as empty slots, and randomly identifies one of the estimated empty slots. Note that the slot decision unit 68 may identify a slot whose interference power is the minimum. As a result, the slot decision unit 68 determines a slot which is synchronized with the control slot information and which arrives in the frame's cycle.

Also, the slot decision unit 68 identifies slots in such a manner that the slots arrive in a broadcast cycle according to the cycle information. For example, if the broadcast cycle is "two frames", the slot decision unit 68 identifies one slot contained in a predetermined frame but does not identify any slot contained in the next frame and then identifies one slot contained in the next frame (i.e., the third frame from said predetermined frame). As described above, the thus identified slots have the same relative timings in a given frame.

If the constraint information is contained in the control information, the slot decision unit 68 will determine if the constraint information satisfies the positional information and the moving rate information. As described above, the slot decision unit 68 uses the cycle information if the constraint information satisfies them, whereas the slot decision unit 68 does not use the cycle information if it doesn't. Also, if the validity information is contained in the control information, the slot decision unit 68 will select a slot such that the slots arrive in a broadcast cycle according to the cycle information, until the validity indicated by the validity information expires. After the validity period has expired, the slot decision unit 68 uses a default value as the broadcast cycle.

Also, the slot decision unit 68 may adjust the timing in such a manner that the broadcast cycle according to the cycle information is taken as the minimum cycle. If the broadcast cycle is set to "two frames" in the cycle information, the slot decision unit 68 may set the broadcast cycle to "three frames". In this case, the slot decision unit 68 determines the broadcast cycle according to an application used at the terminal apparatus 14. Finally, the slot decision unit 68 outputs information on the selected slot to the generator 64.

The notification unit 70 acquires the data sent from not-shown other terminal apparatuses 14 and conveys the approach or the like of the not-shown other vehicles to a driver via a monitor or speaker according to the content of the data. The processing performed by the notification unit 70 is not limited thereto. The control unit 58 controls the entire operation of the terminal apparatus 14.

Figure 6:
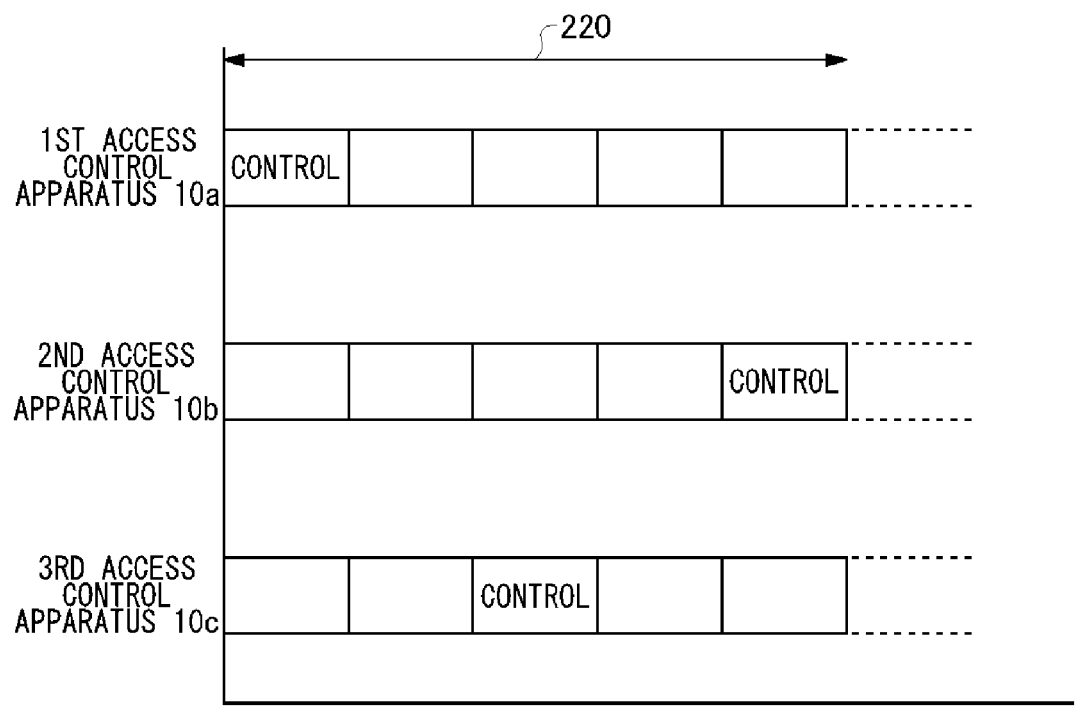
FIG. 6 shows an operational overview of the communication system of FIG. 1.

An operation of the communication system 100 configured as above is now described. FIG. 6 shows an operational overview of the communication system 100. The horizontal direction of FIG. 6 corresponds to time, and the first access control apparatus 10 to the third access control apparatus 10c are indicated along the vertical direction of FIG. 6. Only the control region 220 in FIG. 3B is shown in FIG. 6. As described earlier, assumed herein that five control slots are assigned to the control region 220. "Control" in FIG. 6 indicates control information. The first access control apparatus 10a uses the leading control slot. The second access control apparatus 10b uses the fifth control slot. The third access control apparatus 10c uses the third control slot. As a result, the interference among the control information transmitted by broadcast from the respective access control apparatuses 10 is reduced.

Figure 7:
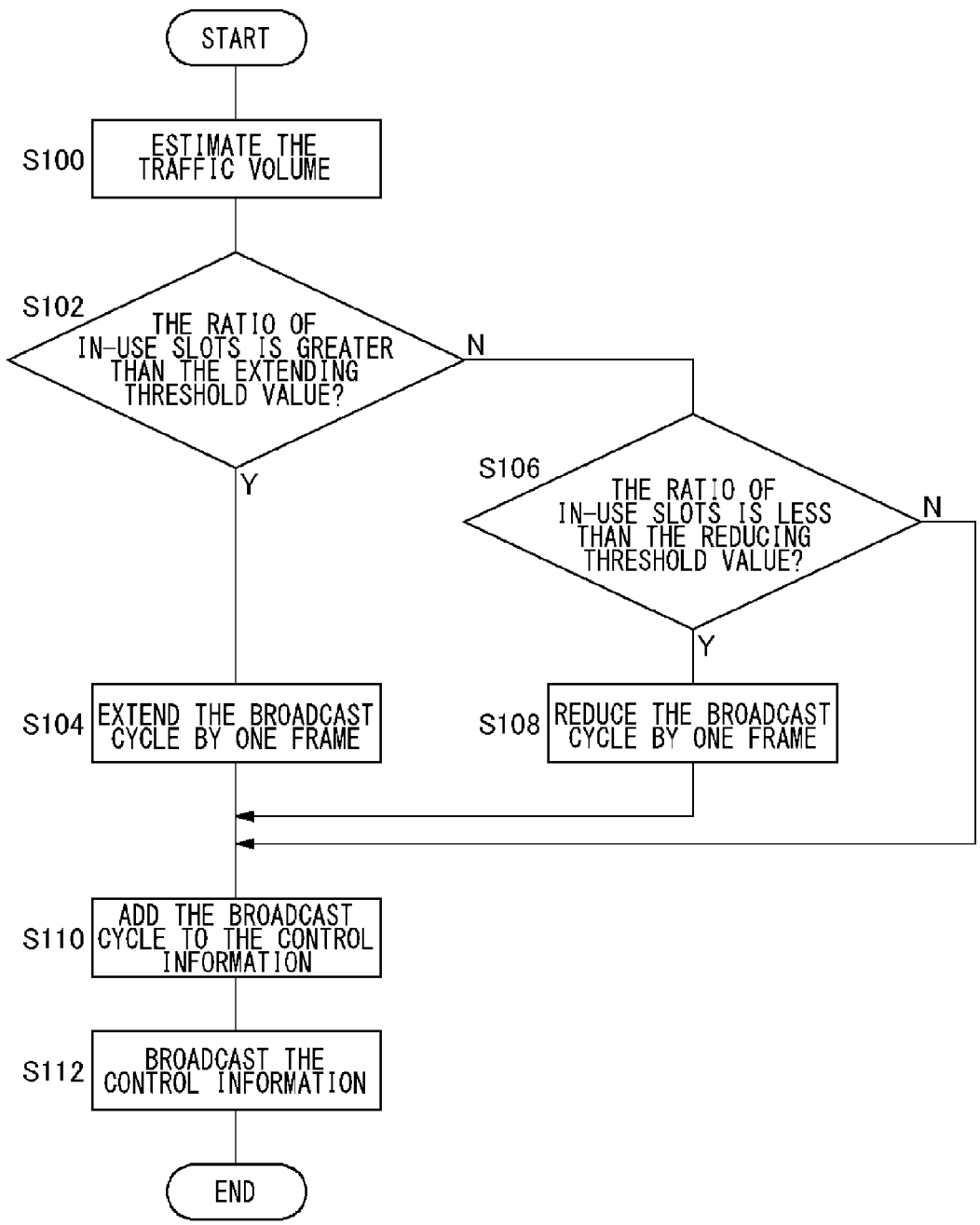
FIG. 7 is a flowchart showing a procedure in which control information is broadcast by the access control apparatus of FIG. 2.

FIG. 7 is a flowchart showing a procedure in which control information is broadcast by the access control apparatus 10. The estimation unit 166 estimates the traffic volume (S100). If the ratio of in-use slots is greater than the extending threshold value (Y of S102), the estimation unit 166 will determine the extension of the broadcasting cycle by one frame (S104). If, on the other hand, the ratio of in-use slots is not greater than the extending threshold value (N of S102) and the ratio of in-use slots is less than the reducing threshold value (Y of S106), the decision unit 168 will determine the reduction of the broadcasting cycle by one frame (S108). If the ratio of in-use slots is not less than the reducing threshold value (N of S106), the decision unit 168 will not change the broadcast cycle. The processing unit 156 adds the broadcast cycle to the control information (S110). The modem unit 154, the RF unit 152 and the antenna 150 broadcast the control information (S112).

Figure 8:
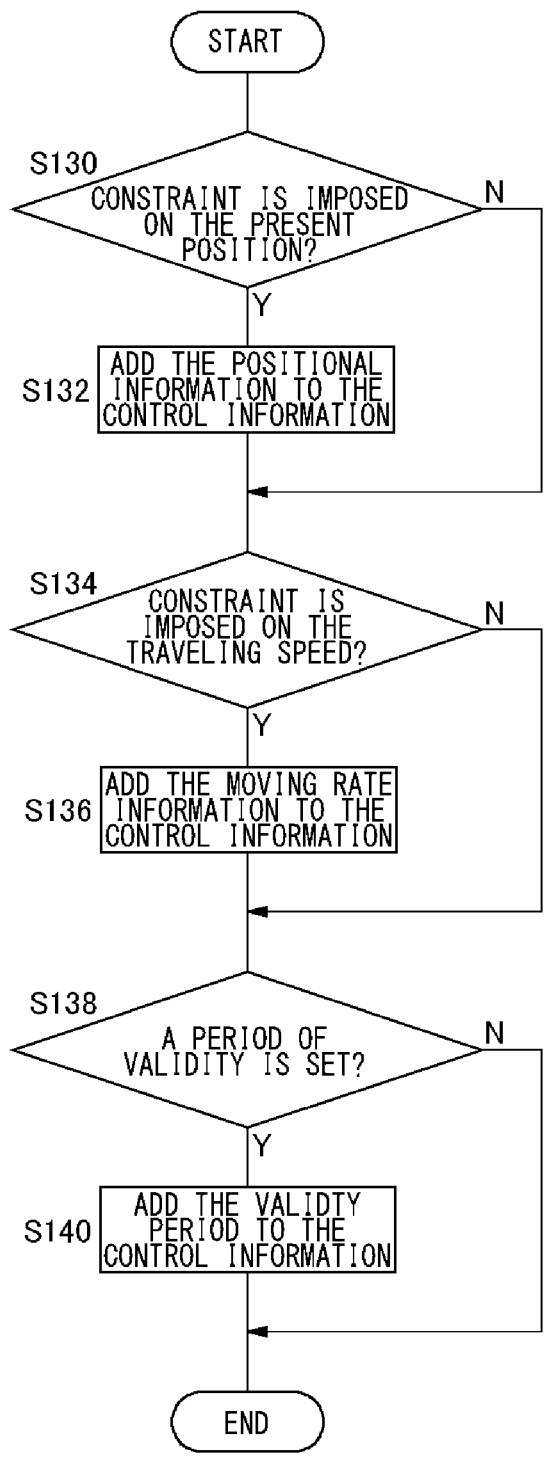
FIG. 8 is a flowchart showing a procedure in which control information is generated by the access control apparatus of FIG. 2.

FIG. 8 is a flowchart showing a procedure in which the control information is generated by the access control apparatus 10. This corresponds to an operation in which information other than the control slot information, the identification information, the cycle information and the like is added to the control information. If a constraint is imposed on the present position (Y of S130), the processing unit 156 will add the positional information to the control information (S132). If no constraint is imposed on the present position (N of S130), Step S132 will be skipped. If a constraint is imposed on the traveling speed (Y of S134), the processing unit 56 will add the moving rate information to the control information (S136). If no constraint is imposed on the travelling speed (N of S134), Step S136 will be skipped. If a period of validity is set (Y of S138), the processing unit 156 will add the validity period to the control information (S140). If no validity period is set (N of S138), Step S140 will be skipped.

Figure 9:
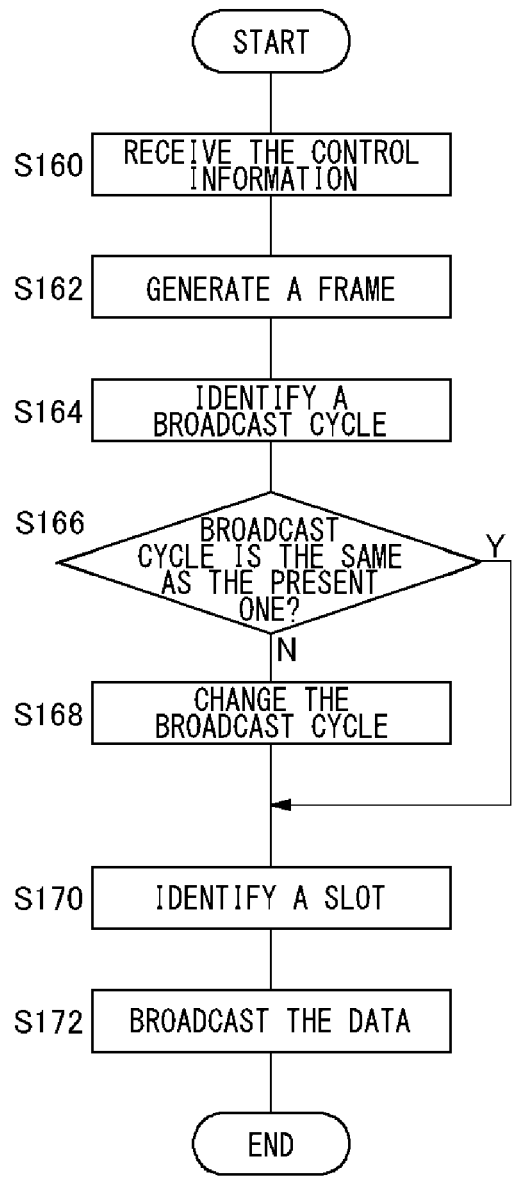
FIG. 9 is a flowchart showing a procedure in which data is broadcast by the terminal apparatus of FIG. 5.

FIG. 9 is a flowchart showing a procedure in which data is broadcast by the terminal apparatus 14. The control information extraction unit 66 receives the control information (S160), generates frames (S162) and, at the same time, identifies the broadcast cycle (S164). If the broadcast cycle differs (N of S166), the slot decision unit 68 will change the broadcast cycle (S168). If the broadcast cycle is the same as one at present (Y of S166), Step S168 will be skipped. The decision unit 168 identifies slots (S170). The generator 64 broadcast data (S172).

Figure 10:
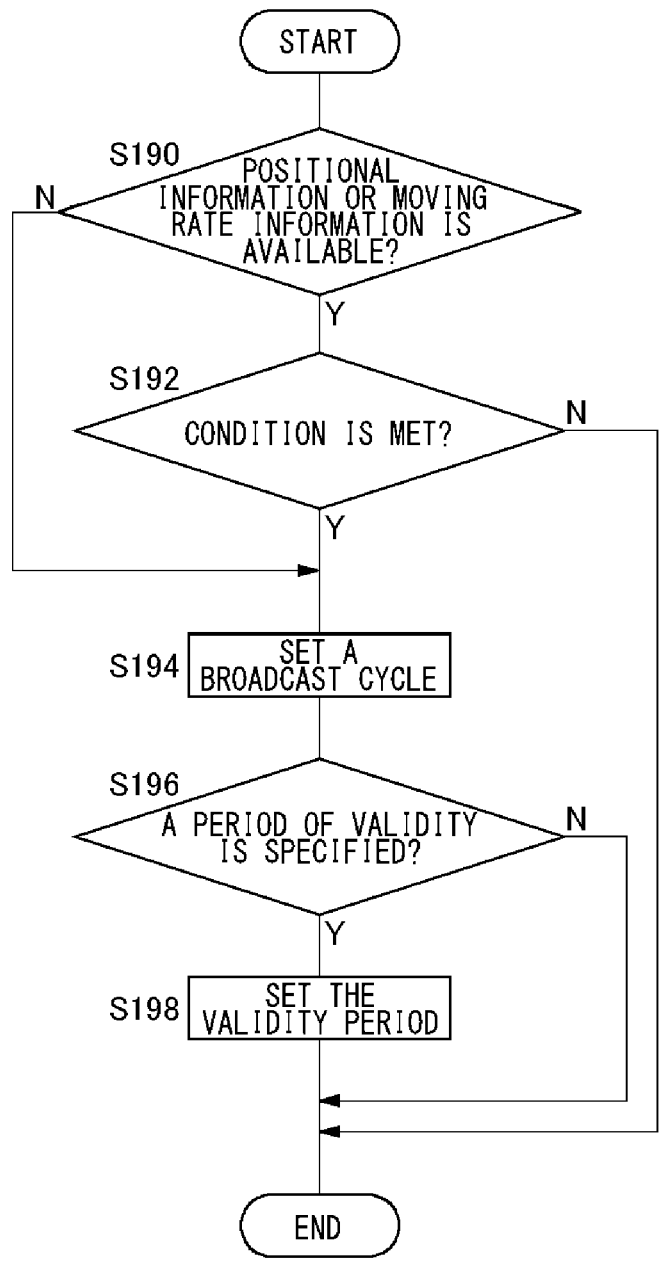
FIG. 10 is a flowchart showing a procedure in which a broadcast cycle is set by the terminal apparatus of FIG. 5.

FIG. 10 is a flowchart showing a procedure in which a broadcast cycle is set by the terminal apparatus 14. If the positional information or the moving rate information is available (Y of S190) and it satisfies a condition (Y of S192), the slot decision unit 68 will set a broadcast cycle (S194). If, on the other hand, neither the positional information nor the moving rate information is available (N of S190), Step S192 will be skipped. The slot decision unit 68 sets a broadcast cycle (S194). If a period of validity is specified (Y of S196), the slot decision unit 68 will set the validity period (S198). If no validity period is specified (N of S196), Step S198 will be skipped. If the condition is not met (N of S192), Step S194 to Step S198 will be skipped. If the validity period expires or the control information is no longer received from the access control apparatus 10, the slot decision unit 68 will reset the broadcast cycle to the original value.

A modification will now be described. Similar to the exemplary embodiments, the modification relates to a communication system 100 including the access control apparatus 10 and the terminal apparatuses 14. In the exemplary embodiments, the access control apparatus 10 broadcasts the timing of a frame and the broadcast cycle using the control information. According to the modification, the access control apparatus 10 broadcasts frames by adding still another information to the control information for the purpose of further reducing the collision probability of data. The access control apparatus 10 identifies slots not used in communication among a plurality of terminal terminals (hereinafter referred to as "empty slots" or "unused slots") by measuring the received power in each slot. Note that those which may be assigned as the empty slots are those excluding the control slots. The access control apparatus 10 identifies slots having any collision (hereinafter referred to as "collision slots") by also measuring in each slot for any collision of packet signals transmitted by the plurality of terminal apparatuses. Note also that those which may be identified as the collision slots are those excluding the control slots.

The access control apparatus 10 further adds information on the identified empty slots and the identified collision slots to the control information. A terminal apparatus 14 estimates empty slots based on the control information, and randomly selects a slot out of the empty slots. Further, the terminal apparatus 14 transmits, by broadcast, the data using the selected slot. The communication system 100 and the terminal apparatus 14 according to the modification are of similar type to those described in conjunction with FIG. 1 and FIG. 5. A description is given here centering around features different from those described in conjunction with FIG. 1 and FIG. 5.

Figure 11:
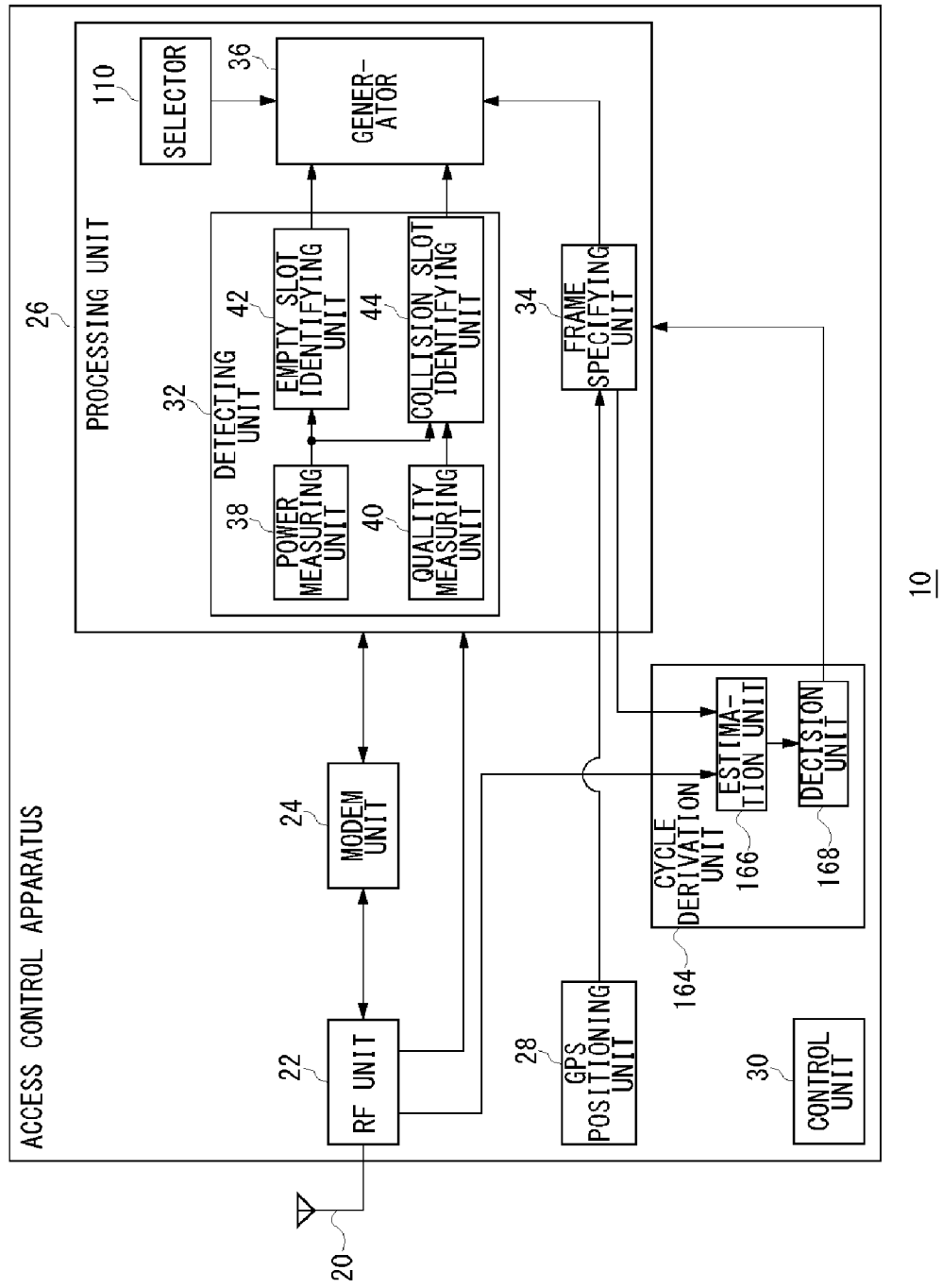
FIG. 11 shows a structure of an access control apparatus according to a modification.

FIG. 11 shows a structure of the access control apparatus 10 according to the modification. The access control apparatus 10 includes an antenna 20, an RF unit 22, a modem unit 24, a processing unit 26, a GPS positioning unit 28, a control unit 30, and a cycle derivation unit 164. The processing unit 26 includes a detecting unit 32, a frame specifying unit 34, a generator 36, and a selector 110. The detecting unit 32 includes a power measuring unit 38, a quality measuring unit 40, an empty slot identifying unit 42, and a collision slot identifying unit 44. The cycle derivation unit 164 includes an estimation unit 166 and a decision unit 168. The antenna 20, the RF unit 22, the modem unit 24, the GPS positioning unit 28, the control unit 30, the frame specifying unit 34, and the cycle derivation unit 164 correspond respectively to the antenna 150, the RF unit 152, the modem unit 154, the GPS positioning unit 158, the control unit 162, the frame generator 160, and the cycle derivation unit 164, and therefore the repeated description thereof is omitted here.

The selector 110 performs carrier sensing on each slot of the respective plurality of control slots in the control region 220, and selects one control slot out of them based on the carrier sensing result. Since the processing performed by the selector 110 is similar to that performed by the processing unit 156 of FIG. 2, the description thereof is omitted here. The selector 110 outputs information on the selected control slot to the generator 36.

The power measuring unit 38 receives a received signal from the RF unit 22 or the modem unit 24 and measures the received power. Note that the received power is measured slot by slot. Also, slots correspond to slots other than the control slots. Hence, the power measuring unit 38 measures the received power for each of the plurality of slots. The power measuring unit 38 outputs the received power for each slot to the empty slot identifying unit 42 and the collision slot identifying unit 44. The quality measuring unit 40 receives the demodulation result from the modem unit 24 and measures the signal quality for each of the plurality of slots. The signal quality measured herein is the error rate. Here, slots correspond to slots other than the control slots, too. It should be noted that known art can be used for the measurement of the error rate, so that the description thereof is omitted here. Also, instead of the error rate, EVM (Error Vector Magnitude) or the like may be measured as the signal quality. The quality measuring unit 40 outputs the error rate to the collision slot identifying unit 44.

The empty slot identifying unit 42 receives the received power for each slot from the power measuring unit 38. The empty slot identifying unit 42 compares each received power against a threshold value (hereinafter referred to as "threshold value for empty slot") and identifies the slot for which the received power is smaller than the threshold value for empty slot. That is, the empty slot identifying unit 42 detects, from among a plurality of slots other than those contained in the control region 220, a slot that can be used in communication among a plurality of terminal apparatuses, as an empty slot. Note here that when there are a plurality of empty slots, the empty slot identifying unit 42 identifies them as empty slots. The empty slot identifying unit 42 outputs information on the identified empty slots to the generator 36.

The collision slot identifying unit 44 receives the received power for each slot from the power measuring unit 38 and receives the error rate for each slot from the quality measuring unit 40. Also, the collision slot identifying unit 44 associates the received power with the error rate, slot by slot. The collision slot identifying unit 44 not only compares the received power against a first threshold value, but also compares the error rate against a second threshold value, slot by slot. The collision slot identifying unit 44 identifies, as a collision slot, a slot for which the received power is larger than the first threshold value and at the same time the error rate is higher than the second threshold value. That is, the collision slot identifying unit 44 recognizes, as a collision slot, a slot for which the received power is large but the communication quality is inferior. In this manner, the collision slot identifying unit 44 detects, as a collision slot, a slot in which a collision has occurred due to duplicate transmission of signals sent from a plurality of terminal apparatuses. The collision slot identifying unit 44 outputs information on the identified collision slots to the generator 36.

The generator 36 receives information on empty slots from the empty slot identifying unit 42 and also receives information on collision slots from the collision slot identifying unit 44. The generator 36 generates control information by adding the information on empty slots and the information on collision slots thereto. Note here that the numbers, 1, 2, . . . from the start (hereinafter referred to as "slot numbers") are given respectively to a plurality of slots contained in a frame. The generator 36 adds the slot number(s) of the empty slot(s) contained in the previous frame(s) as information on empty slots to the control information. Further, as the generator 36 receives the broadcast cycle fed from the decision unit 168, the generator 36 generates cycle information on the broadcast cycle. The generator 36 stores the cycle information in the control information, too. The same applies to the constraint information and the like and the repeated description thereof is omitted here. Also, the generator 36 receives information on frames and slots from the frame specifying unit 34. The generator 36 periodically assigns the control information to any one of control slots. The generator 36 outputs the control information to the modem unit 24, using the thus assigned control slot.

In the exemplary embodiments, the slot decision unit 68 of the terminal apparatus 14 estimates empty slots based on the carrier sensing result. According to the modification, in contrast thereto, the slot decision unit 68 estimates empty slots based on the information on empty slots and/or the information on collision slots contained in the control information. A description is given herein of processing performed by the terminal apparatus 14 according to the modification.

The control information extraction unit 66 receives the control information fed from the modem unit 54. The control information extraction unit 66 acquires the information on empty slots and the information on collision slots from the control information. The control information extraction unit 66 outputs the information on empty slots and the information on collision slots to the slot decision unit 68. The slot decision unit 68 receives the information on empty slots and the information on collision slots from the control information extraction unit 66. The slot decision unit 68 selects empty slot(s) from among the slots excluding those of the control region 220 in each frame.

While such processing continues, the control information extraction unit 66 continues to extract the information on empty slots and the information on collision slots, from the control information, frame by frame. Based on the information on collision slots, the slot decision unit 68 checks to see if any of the slot numbers corresponding to the slots in current use is mistaken as a collision slot. If no slot is mistaken as a collision slot, the slot decision unit 68 will continue to output the same slot numbers as before to the generator 64. If, on the other hand, any slot is mistaken as a collision slot, the slot decision unit 68 will again estimate empty slots based on the information on empty slots. In other words, the slot decision unit 68 repeats the previous processing.

If the control information received by the control information extraction unit 66 does not contain the information on empty slots, the slot decision unit 68 may execute the operation described in the exemplary embodiments. This corresponds to a case where broadcast is not the control information from the access control apparatus 10 of FIG. 11 but the control information from the access control apparatus 10 of FIG. 2. In this case, the slot decision unit 68 performs carrier sensing on each of a plurality of slots contained in the frame generated by the control information extraction unit 66. If the control information extraction unit 66 does not receive the information on empty slots, the slot decision unit 68 will estimate empty slots based on the carrier sensing result obtained from the carrier sensing unit 80.

Figure 12:
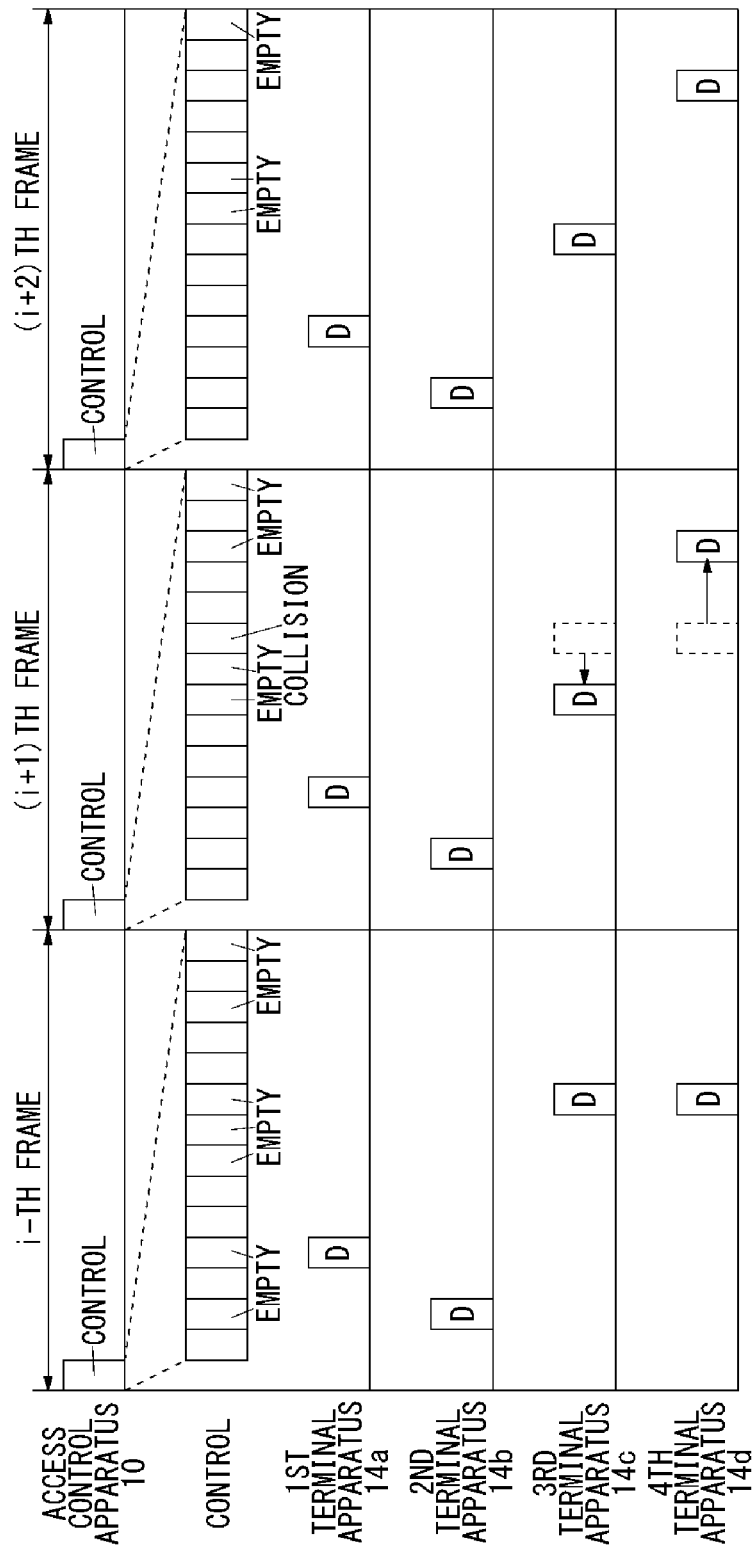
FIG. 12 shows an operational overview of a communication system according to a modification.

FIG. 12 shows an operational overview of the communication system 100 according to the modification. The horizontal direction of FIG. 12 corresponds to time, and three frames that are an ith frame to an (i+2)th frame are indicated as described in the top row. Assume herein for the clarity of description that the number of control slots contained in each frame is one and each frame contains 15 slots. As shown in FIG. 12, the access control apparatus 10 broadcasts the control information using the leading slot of each frame. "Control" in FIG. 9 indicates control information. Below "control", information on empty slots and information on collision slots both contained in the control information are indicated by associating them with slots. "Empty" in FIG. 12 indicates an empty slot, whereas "collision" in FIG. 12 indicates a collision slot.

In the rows below the top row, the timings with which the first terminal apparatus 14a to the fourth terminal apparatus 14d broadcast the data are indicated. "D" in FIG. 12 means data. The first terminal apparatus 14a to the fourth terminal apparatus 14d each references the control information and selects an empty slot. The first terminal apparatus 14a to fourth terminal apparatus 14d each broadcasts the data using the selected empty slot in the ith frame. Since the empty slot selected by the third terminal apparatus 14c is identical to the empty slot selected by the fourth terminal apparatus 14d, the data broadcast from them collide with each other. The access control apparatus 10 detects the occurrence of collision in said slot. The control information, broadcast from the access control apparatus 10, in the (i+1)th frame indicates the slot where the collision occurs, as the information on the collision slot.

Since no collision occurs in the slots used by the first terminal apparatus 14a and the second terminal apparatus 14b, the slots having the same slot numbers are used again. On the other hand, since collision has occurred in the slots used by the third terminal apparatus 14c and the fourth terminal apparatus 14d, different empty slots are selected again. The third terminal apparatus 14c and the fourth terminal apparatus 14d broadcast the data, using the selected empty slots. Since not all of data collides, the collision slots are not indicated in the control information, broadcast from the access control apparatus 10, in the (i+2)th frame. Thus, the first terminal apparatus 14a to the fourth terminal apparatus 14d use again the slots, having the same slot numbers as the slots used already, in the (i+2)th frame.

Figure 13:
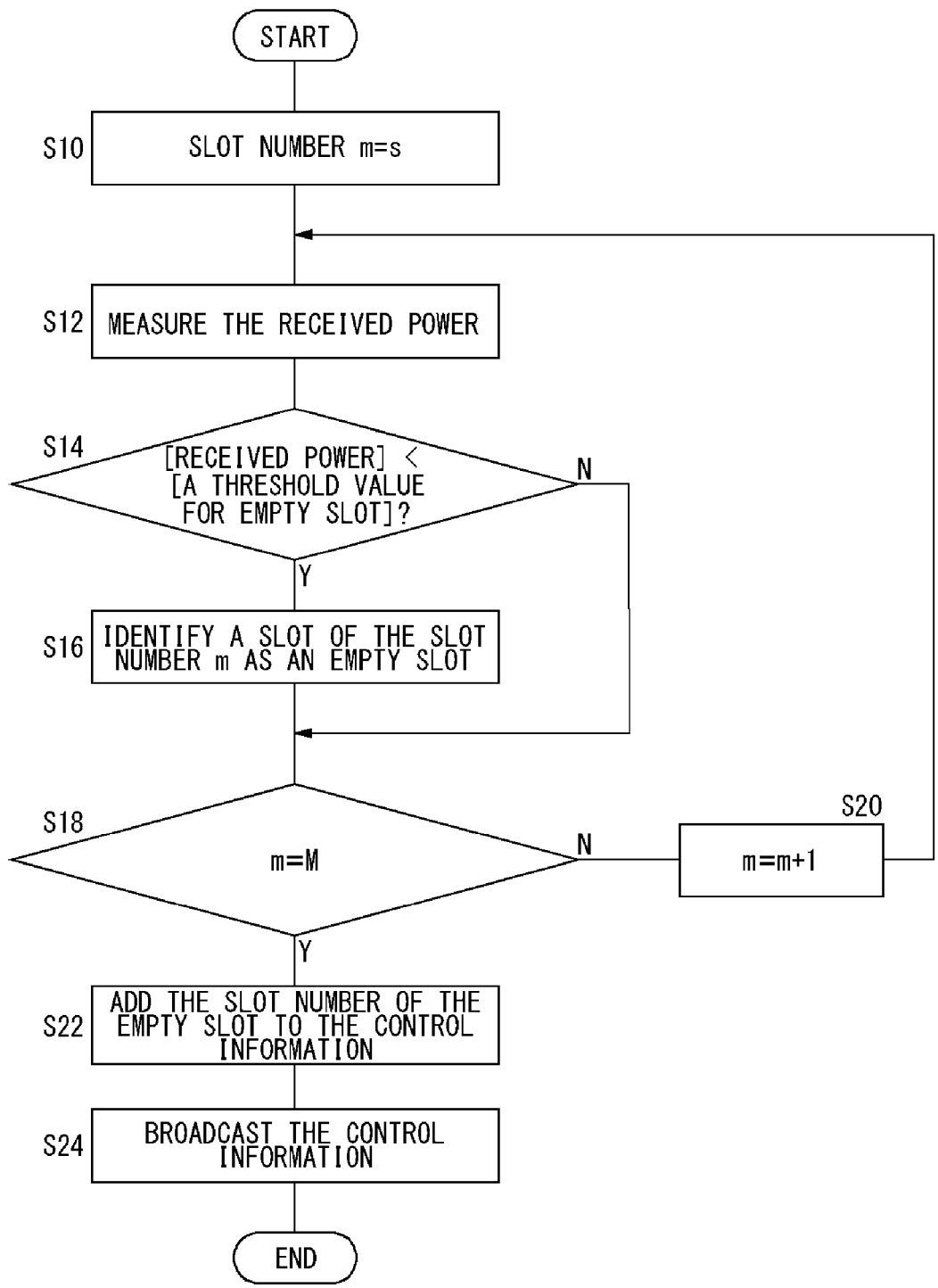
FIG. 13 is a flowchart showing a procedure in which an empty slot is notified by the access control apparatus of FIG. 11.

FIG. 13 is a flowchart showing a procedure in which the access control apparatus 10 conveys an empty slot. The detecting unit 32 sets the slot number m to "s" (S10). The power measuring unit 38 measures the received power (S12). If the received power is less than the threshold value for empty slot (Y of S14), the empty slot identifying unit 42 will identify the slot of the slot number m as an empty slot (S16). If the received power is not less than the threshold value for empty slot (N of S14), the empty slot identifying unit 42 will skip the process of Step S16. If the slot number m is not equal to the maximum number M (N of S18), the detecting unit 32 will increment the slot number m by 1 (S20) and the process will return to Step S12. If, on the other hand, the slot number m is the maximum number M (Y of S18), the generator 36 will add the slot number of the empty slot to the control information (S22). The modem unit 24 and the RF unit 22 broadcast the control information (S24).

Figure 14:
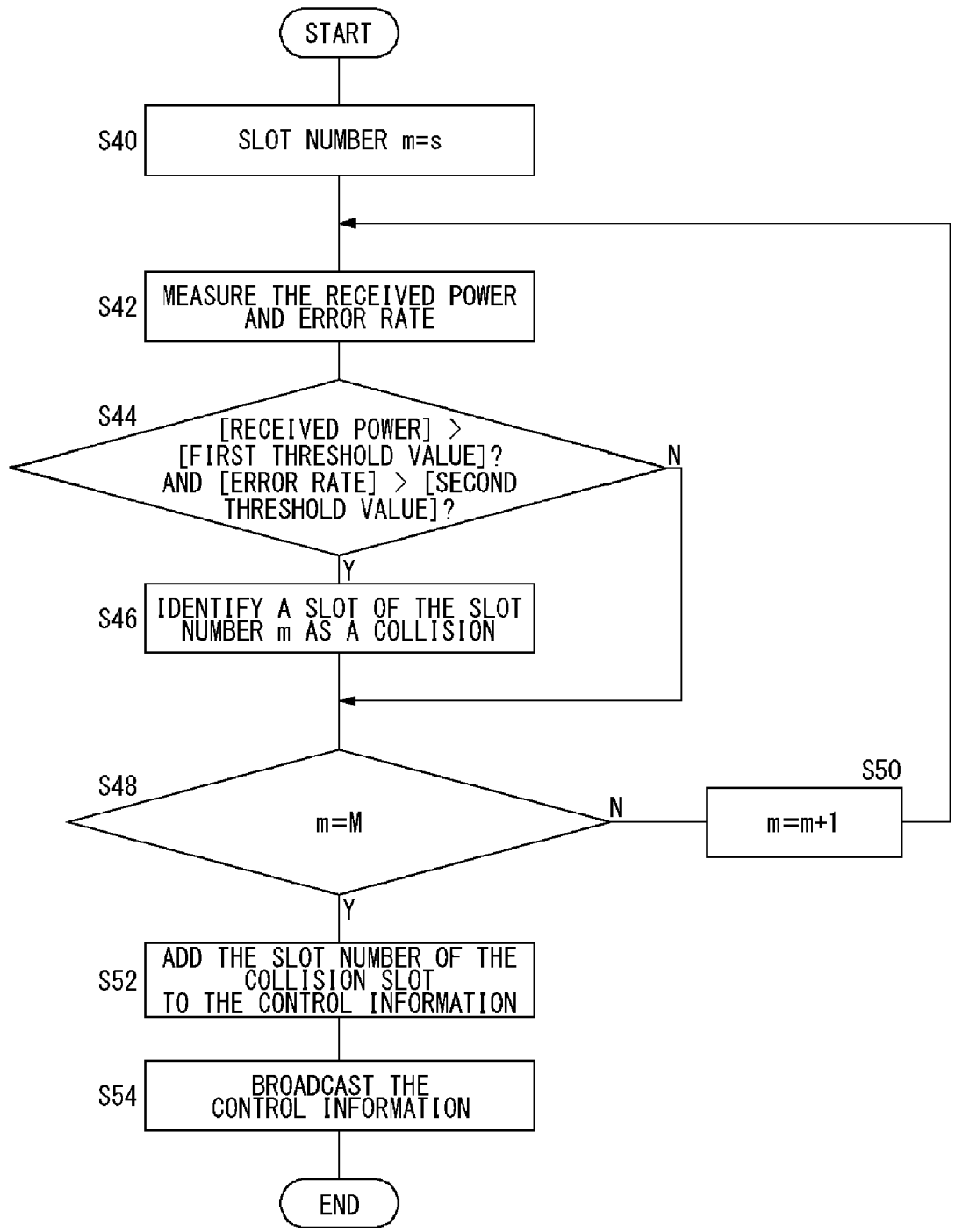
FIG. 14 is a flowchart showing a procedure in which a collision slot is notified by the access control apparatus of FIG. 11.

FIG. 14 is a flowchart showing a procedure in which the access control apparatus 10 conveys a collision slot. The detecting unit 32 sets the slot number m to "s" (S40). The power measuring unit 38 measures the received power, and the quality measuring unit 40 measures the error rate (S42). If the received power is greater than the first threshold value and the error rate is greater than the second threshold value (Y of S44), the collision slot identifying unit 44 will identify the slot of the slot number m as a collision slot (S46). If the received power is not greater than the first threshold value or the error rate is not greater than the second threshold value (N of S44), the collision slot identifying unit 44 will skip the process of Step S46. If the slot number m is not equal to the maximum number M (N of S48), the detecting unit 32 will increment the slot number m by 1 (S50) and the process will return to Step S42. If, on the other hand, the slot number m is the maximum number M (Y of S48), the generator 36 will add the slot number of the collision slot to the control information (S52). The modem unit 24 and the RF unit 22 broadcast the control information (S54).

Figure 15:
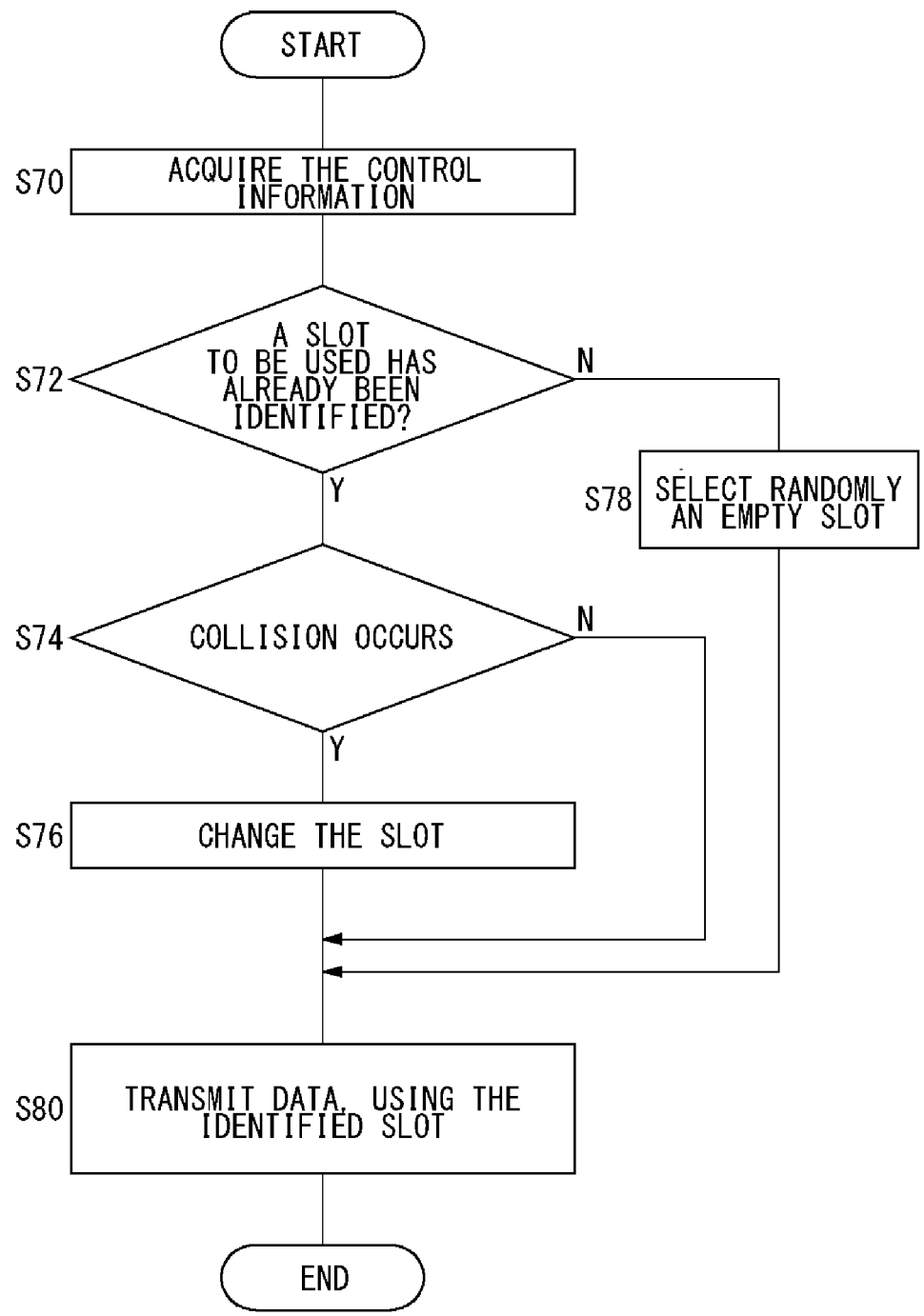
FIG. 15 is a flowchart showing a procedure in which data is transmitted by a terminal apparatus according to a modification.

FIG. 15 is a flowchart showing a data transmission procedure performed by the terminal apparatus 14 according to the modification. The control information extraction unit 66 acquires the control information (S70). If a slot to be used has already been identified (Y of S72), the slot decision unit 68 will verify whether collision occurs in this slot or not. If collision occurs (Y of S74), the slot decision unit 68 will change the slot (S76). If no collision occurs (N of S74), Step S76 will be skipped. If, on the other hand, a slot to be used has not already been identified (N of S72), the slot decision unit 68 will estimate empty slots and then randomly identify an empty slot (S78). The generator 64 transmits the data, using the thus identified slot (S80).

By employing the exemplary embodiments, the access control apparatus broadcasts the broadcast cycle in which data is broadcast, so that the broadcast cycle of terminal apparatuses can be controlled. Also, since the broadcast cycle of terminal apparatuses is controlled, the traffic volume in the communications between the terminal apparatuses can be controlled. Also, since the traffic volume in the communications between the terminal apparatuses is controlled, the collision probability of packet signals can be reduced even when the communication volume has increased. Also, the broadcast cycle is determined according to the estimated traffic volume, control suitable for the present traffic volume can be performed. Also, since the broadcast cycle is determined according to the estimated traffic volume, the traffic volume can be reduced when the traffic volume has increased. Also, since the traffic volume is reduced, the collision probability of packet signals can be reduced.

Also, the control information on a terminal apparatus to be controlled by the broadcast cycle is broadcast as well, specific terminal apparatus(es) only can be controlled. Since the specific terminal apparatus only can be controlled, the communication system can be operated flexibly. Also, the location where the terminal apparatus to be controlled should be located is notified as the constraint information, so that only the terminal apparatus located in a predetermined region can be controlled. Also, the traveling speed at which the terminal apparatus to be controlled moves is notified, so that only the terminal apparatus moving at a predetermined speed can be controlled. Also, the broadcast cycle of a terminal apparatus whose moving rate is low is controlled, so that the traffic volume of the terminal apparatus staying within the area for a longer period of time can be controlled.

Also, the broadcast cycle is controlled based on the cycle information, so that a broadcast cycle desired by the access control apparatus can be set. Also, since the broadcast cycle is controlled according to the cycle information where the traffic volume is taken into account in the area as a whole, the traffic volume as a hole can be controlled. Also, the timing is adjusted in a manner such that the broadcast cycle according to the cycle information is taken as the minimum cycle, so that the traffic volume can be further reduced. Also, since the traffic volume is further reduced, the collision probability of packet signals can be further reduced.

Also, data is broadcast using the slots generated according to the control information conveyed from the access control, so that synchronization can be established between a plurality of terminal apparatuses. Also, since synchronization can be established between a plurality of terminal apparatuses, the collision probability of data can be reduced. Also, since the data is broadcast within slots, the occurrence of situations where parts of a plurality of data overlap and thereby collide with each other can be reduced. Also, since the data is broadcast within slots, the usage efficiency of frame can be reduced. Also, empty slots are estimated and any of them is/are selected, so that the collision probability of packet signals can be reduced even when the communication volume has increased. Also, the empty slots are estimated based on the carrier sensing result, so that the empty slots suitable for the surroundings of a terminal apparatus can be estimated.

Also, the empty slots are estimated based on the control information, so that the empty slots suitable for the surroundings of the access control apparatus can be estimated. Also, carrier sensing is performed if the information on empty slots is not contained in the control information, so that the processing according to various access control apparatuses can be carried out. Also, the identification carriers in the control information are not used for data, whereas the remaining subcarriers are also used for data. Thus, even if the control information and data signals collide, the presence of the control information can be detected by observing the signal components of the control information. Also, the guard band is provided between the identification carrier and the other subcarriers, so that the interference therebetween can be reduced and the probability of arrival of information transmitted using the identification carriers can be improved. Also, important information is assigned to the identification carrier, so that the probability of arrival of important information can be improved. Also, the UW is assigned to the identification carrier, so that the degree of accuracy in detecting the identification carriers can be improved.

Also, the control region is reserved for control slots in a plurality of slots contained in each frame. Thus, the interference between the control information and the data can be reduced. Also, a plurality of control slots are assigned to the control region, so that the interference between a plurality of pieces of control information from a plurality of access control apparatuses can be reduced. Also, since the interference therebetween is reduced, the deterioration in the quality of the control information can be suppressed. Also, since the deterioration in the quality of the control information is suppressed, the contents of control information can be transmitted accurately. Also, since the interference between a plurality of pieces of control information is reduced, a plurality of access control apparatuses can be installed. Also, since a plurality of access control apparatuses are installed, the collision probability of packet signals occurring at each intersection can be reduced. Also, control slots not used by other access control apparatuses are estimated, so that the interference between a plurality of pieces of control information can be reduced Also, the slots usable in communication between a plurality of terminal apparatuses are broadcast from among a plurality of slots. Thus the probability of collisions occurring in communication between the plurality of terminal apparatuses can be reduced. Also, since the probability of collisions occurring in communication between the plurality of terminal apparatuses is reduced, the collision probability of packet signals under the conditions of increased volume can be reduced. Also, empty slots are identified based on the received powers of a plurality of slots, respectively, so that the empty slots can be easily identified. Also, the slot number of an empty slot which is contained in a previous frame is broadcast, so that the instructions to the terminal apparatuses can be executed reliably. Also, a terminal apparatus, which is using the empty slot, uses a slot that corresponds to said slot, over a plurality of frames, so that the processing can be simplified. Also, the access control apparatus does not directly participate in the data communication between terminal apparatuses but only conveys a parameter related to the empty slots. Hence, the structure and operation according to the exemplary embodiments are easily applicable to a communication system premised on CSMA/CA, too.

Also, the slot in which a collision has occurred due to duplicate transmission of signals from the plurality of terminal apparatuses is broadcast. Thus, the probability of collisions occurring in communication between the plurality of terminal apparatuses can be reduced. Also, the collision slots are identified based on the received powers of the plurality of slots, respectively, and the signal qualities of the plurality of slots, respectively, so that the collision slots can be easily identified. Also, the slot number of a collision slot which is contained in a previous frame is broadcast, so that the instructions to the terminal apparatuses can be executed reliably. Also, the access control apparatus does not directly participate in the data communication between terminal apparatuses but only conveys a parameter related to the collision slots. Hence, the structure and operation according to the exemplary embodiments are easily applicable to a communication system premised on CSMA/CA, too.

The present invention has been described based on the exemplary embodiments. The exemplary embodiments are intended to be illustrative only, and it is understood by those skilled in the art that various modifications to constituting elements and processes as well as arbitrary combinations thereof could be further developed and that such modifications and combinations are also within the scope of the present invention.

In the exemplary embodiments of the present invention, the frame generator 160 specifies frames each of which is constituted by a plurality of slots. However, this should not be considered as limiting and, for example, the frame generator 160 may provide periods (fields) other than the plurality of slots, in each frame. More specifically, a plurality of slots may be assigned in a partial period of a frame, whereas the CSMA/CA scheme may be used in communication between a plurality of terminal apparatuses 14 in the remaining periods. In such a case, the access control apparatus 10 does not detect the empty slots and the collision slots while the CSMA/CA scheme is in use. According to this modification, each terminal apparatus 14 can select the communication mode between a communication using slots and a communication using the CSMA/CA scheme. Hence, the degree of freedom in communications can be increased. In other words, it suffices that each frame contains a plurality of slots.

In the exemplary embodiments of the present invention, the control information broadcast from the access control apparatus 10 and the data broadcast from a terminal apparatus 14 are each assigned to a single slot. However, this should not be considered as limiting and, for example, the control information and the data may each be assigned to two or more slots. According to this modification, the transmission rate of control information and data can be increased.

In the exemplary embodiments of the present invention, an identification carrier is equivalent to two subcarriers. Also, the identification carrier is assigned to the subcarriers near the center frequency of an OFDM symbol. However, this should not be considered as limiting and, for example, the identification carrier may be equivalent to more than two subcarriers. For example, the identification carrier may be assigned to subcarriers other than those near the center frequency of an OFDM symbol. In such a case, the information on empty slots and/or the information on collision slots may be added to the identification carriers. According to this modification, the communication system 100 can be designed more freely.

In the exemplary embodiments of the present invention, the access control apparatus 10 specifies each frame containing a plurality of slots and specifies a broadcast cycle in units of frame. However, this should not be considered as limiting and, for example, no frame containing a plurality of slots may be specified. In such a case, the broadcast cycle is indicated in terms of time. According to this modification, the present invention may be applicable to various types of communication systems.

In the exemplary embodiments of the present invention, the decision unit 168 determines the broadcast cycle according to the ratio of in-use slots. However, the exemplary embodiments are not limited thereto and, for example, the decision unit 168 may determine the broadcast cycle according to the number of slots used in each frame and/or the number of slots not used in each frame. If the number of unused slots is smaller than the extending threshold value, the decision unit 168 will determine the extension of the broadcast cycle by one frame. If, on the other hand, the number of unused slots is larger than the reducing threshold value, the decision unit 168 will determine the reduction of the broadcast cycle by one frame. In such a case, the extending threshold value is specified such that the extending threshold value is smaller than the reducing threshold value. According to this modification, it is only necessary to count the number of unused slots, so that the processing amount can be reduced.

In the exemplary embodiments of the present invention, the cycle information and the like are stored in the control information. However, this should not be considered as limiting and, for example, the control information may contain information on the type of a vehicle equipped with the terminal apparatus 14 (hereinafter referred to as "vehicle information"). Though the vehicle information indicates vehicles, bicycles and the like, the vehicle information may indicate pedestrians. Further, the broadcast cycle may be set for each vehicle type and the cycle information may be so generated as to include such the broadcast cycle. According to this modification, the broadcast cycles can be controlled minutely.

DESCRIPTION OF THE REFERENCE NUMERALS

10 Access control apparatus
12 Vehicle
14 Terminal apparatus
50 Antenna
52 RF unit
54 Modem unit
56 Processing unit
58 Control unit
60 Timing identifying unit
62 Acquisition unit
64 Generator
66 Control information extraction unit
68 Slot decision unit
70 Notification unit
100 Communication system
150 Antenna
152 RF unit
154 Modem unit
156 Processing unit
158 GPS positioning unit
160 Frame generator
162 Control unit
164 Cycle derivation unit
166 Estimation unit
168 Decision unit

INDUSTRIAL APPLICABILITY

The present invention reduces the collision probability of packet signals even when the communication volume has increased.

What is claimed is:

1. An access control apparatus comprising:
a controller configured to control communication between terminal apparatuses without having any direct involvement in data communication between the terminal apparatuses and without directly specifying a slot to be used in the data communication;
a generator configured to generate timing information on timing of a frame with which each of the terminal apparatuses is to synchronize in communication between the terminal apparatuses when each of the terminal apparatuses broadcasts a signal, the frame being followed by other frames; and
a broadcasting unit configured to broadcast a packet including the timing information generated by said generator, wherein
said generator further generates cycle information on a broadcast cycle, the broadcast cycle being an interval between broadcasts of signals by each of the terminal apparatuses, in communication between the terminal apparatuses,
said broadcasting unit broadcasts the cycle information generated by said generator, together with the timing information,
the access control apparatus further comprises a decision unit configured to increase the broadcast cycle by an integral multiple of the broadcast cycle or decrease the broadcast cycle by a reciprocal of an integral multiple thereof, and output a determined broadcast cycle to the generator, and
the cycle information is included in the packet together with the timing information.

2. The access control apparatus according to claim 1, further comprising:
an estimation unit configured to estimate a traffic volume in communication between the terminal apparatuses; and
the decision unit configured to determine the broadcast cycle according to the traffic volume estimated by said estimation unit.

3. The access control apparatus according to claim 1, wherein
said generator generates constraint information on a terminal apparatus to be controlled by the cycle information, and
said broadcasting unit broadcasts the constraint information generated by said generator, together with the cycle information.

4. The access control apparatus according to claim 3, wherein said generator generates positional information on a position where the terminal apparatus to be controlled is to be located, as the control information.

5. A broadcasting method comprising:
controlling communication between terminal apparatuses without having any direct involvement in data communication between the terminal apparatuses and without directly specifying a slot to be used in the data communication;
generating timing information on timing of a frame with which each of terminal apparatuses is to synchronize in communication between the terminal apparatuses when the each of terminal apparatuses broadcasts a signal, the frame being followed by other frames; and
broadcasting a packet including the generated timing information, wherein
said generating generates cycle information on a broadcast cycle, the broadcast cycle being an interval between broadcasts of signals by each of the terminal apparatuses, in communication between the terminal apparatuses,
said broadcasting broadcasts the generated cycle information, together with the timing information,
the broadcasting method further includes increasing the broadcast cycle by an integral multiple of the broadcast cycle or decreasing the broadcast cycle by a reciprocal of an integral multiple thereof, and outputting a determined broadcast cycle, and
the cycle information is included in the packet together with the timing information.

6. The broadcasting method according to claim 5, further comprising:
estimating a traffic volume in communication between the terminal apparatuses; and
determining the broadcast cycle according to the estimated traffic volume.

7. A terminal apparatus, comprising:
a receive unit configured to receive, from an access control apparatus for controlling communication between terminal apparatuses without having any direct involvement in data communication between the terminal apparatuses and without directly specifying a slot to be used in the data communication, a packet including timing information on timing of a frame with which each of the terminal apparatuses is to synchronize when the each of the terminal apparatuses broadcasts a signal, the frame being followed by other frames;
a decision unit configured to determine timing synchronized with the timing information received by said receive unit and defining the timing of a broadcast of a signal subsequent to a previous broadcast of a signal; and
a broadcasting unit configured to broadcast the signal with the timing determined by said decision unit, wherein
said receive unit further receives, from the access control apparatus, cycle information on a broadcast cycle, the broadcast cycle being an interval between broadcasts of signals by each of the terminal apparatuses and being increased by an integral multiple of the broadcast cycle or decreased by a reciprocal of an integral multiple thereof by the access control apparatus,
said decision unit adjusts the timing of a broadcast of a signal subsequent to a previous broadcast of a signal according to the cycle information received by said receive unit, and
the cycle information is included in the packet together with the timing information.

8. The terminal apparatus according to claim 7, wherein the access control apparatus determines the cycle information received by said receive unit, according to a traffic volume in communication between the terminal apparatuses.

9. The terminal apparatus according to claim 7, wherein
the cycle information received by said receive unit contains validity information on a period of validity, and
said decision unit adjusts the timing of the broadcast of a signal subsequent to the previous broadcast of a signal before the period of validity ends according to the cycle information received by said receive unit.

10. The terminal apparatus according to claim 7, wherein said decision unit adjusts the timing so that the broadcast cycle according to the cycle information takes a minimum cycle.

11. The terminal apparatus according to claim 7, wherein the broadcast cycle is determined according to a traffic volume in communication between the terminal apparatuses, the traffic volume being estimated by the access control apparatus.

12. A broadcasting method, comprising:
receiving, from an access control apparatus for controlling communication between terminal apparatuses without having any direct involvement in data communication between the terminal apparatuses and without directly specifying a slot to be used in the data communication, a packet including timing information on timing of a frame with which each of the terminal apparatuses is to synchronize when the each of the terminal apparatuses broadcasts a signal, the frame being followed by other frames;
determining timing synchronized with the received timing information and defining the timing of a broadcast of a signal subsequent to a previous broadcast of a signal;
broadcasting the signal with the determined timing;
further receiving, from the access control apparatus, cycle information on a broadcast cycle, the broadcast cycle being an interval between broadcasts of signals by each of the terminal apparatuses and being increased by an integral multiple of the broadcast cycle or decreased by a reciprocal of an integral multiple thereof by the access control apparatus;
adjusting the timing of the broadcast of a signal subsequent to the previous broadcast of a signal according to the received cycle information; and
broadcasting the signal with the adjusted timing, wherein the cycle information is included in the packet together with the timing information.

13. The broadcasting method according to claim 12, wherein the broadcast cycle is determined according to a traffic volume in communication between the terminal apparatuses, the traffic volume being estimated by the access control apparatus.

* * * * *